United States Patent
Sagou et al.

(10) Patent No.: US 10,427,498 B2
(45) Date of Patent: Oct. 1, 2019

(54) RADIANT HEATER

(71) Applicant: DENSO CORPORATION, Kariya, Aichi-pref. (JP)

(72) Inventors: Yasuhiro Sagou, Kariya (JP); Hideaki Kako, Kariya (JP); Kimitake Ishikawa, Kariya (JP); Hiroyasu Oide, Kariya (JP); Hideki Seki, Kariya (JP); Kouji Kondoh, Kariya (JP); Kazuo Tada, Kariya (JP); Masaaki Inoguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 338 days.

(21) Appl. No.: 15/318,927

(22) PCT Filed: Apr. 24, 2015

(86) PCT No.: PCT/JP2015/002231
§ 371 (c)(1),
(2) Date: Dec. 14, 2016

(87) PCT Pub. No.: WO2016/013136
PCT Pub. Date: Jan. 28, 2016

(65) Prior Publication Data
US 2017/0129310 A1    May 11, 2017

(30) Foreign Application Priority Data
Jul. 22, 2014   (JP) ................................ 2014-149054

(51) Int. Cl.
*B60H 1/22* (2006.01)
*F24H 3/00* (2006.01)
*H05B 3/24* (2006.01)

(52) U.S. Cl.
CPC ......... *B60H 1/2225* (2013.01); *B60H 1/2215* (2013.01); *B60H 1/2226* (2019.05);
(Continued)

(58) Field of Classification Search
USPC ................ 219/38, 539, 541, 542, 201, 202, 219/213–214, 217–218, 260–270,
(Continued)

(56) References Cited

U.S. PATENT DOCUMENTS 3,736,404 A * 5/1973 Eisler ....................... H05B 3/84
174/117 A
4,004,128 A * 1/1977 Marchesi ................ F24C 7/081
126/91 A
(Continued)

FOREIGN PATENT DOCUMENTS

JP        S52129029 A    10/1977
JP        2008213661 A    9/2008
(Continued)

*Primary Examiner* — Ibrahime A Abraham
*Assistant Examiner* — Gyounghyun Bae
(74) *Attorney, Agent, or Firm* — Harness, Dickey & Pierce, P.L.C.

(57) ABSTRACT

A heating part of this radiant heater has a plurality of heating wires. The plurality of heating wires are connected in parallel such that a plurality of parallel groups may be formed by electrodes. Further, the plurality of parallel groups are connected in series by the electrodes. The heating parts are set to reach a radiation temperature for emitting the heat radiation which makes a human to feel warmth. The heating parts have a thermal resistance in a longitudinal direction which is set, when an object contacts on the surface, a temperature of the part where the object touches falls to a suppressed temperature lower than the radiation temperature. The temperature of the heating part increases rapidly in response to electric supply. When there is a (Continued)

contact with an object, the temperature of the heating part decreases rapidly.

13 Claims, 13 Drawing Sheets

(52) U.S. Cl.
CPC ............... *F24H 3/002* (2013.01); *H05B 3/24* (2013.01); *H05B 2203/032* (2013.01)

(58) Field of Classification Search
USPC ..... 219/406–411, 443.1–461.1, 462.1–468.2, 219/55; 338/295–334
See application file for complete search history.

(56) References Cited

U.S. PATENT DOCUMENTS

| | | | | |
|---|---|---|---|---|
| 4,132,885 | A * | 1/1979 | Glucksman | F24H 3/002 165/131 |
| 4,147,888 | A * | 4/1979 | Sato | H05B 3/64 219/390 |
| 4,651,124 | A * | 3/1987 | Kirilloff | H01C 3/10 219/531 |
| 4,803,345 | A * | 2/1989 | Hoshizaki | F01N 3/027 219/202 |
| 4,883,947 | A * | 11/1989 | Murase | G01N 27/4067 219/553 |
| 4,888,472 | A * | 12/1989 | Stitz | H05B 3/36 219/548 |
| 4,987,290 | A * | 1/1991 | Okuno | F24H 3/0405 126/92 R |
| 5,437,001 | A * | 7/1995 | Chaney | F24C 7/065 392/373 |
| 5,965,049 | A * | 10/1999 | Carlet | H05B 3/80 219/505 |
| 6,178,292 | B1 * | 1/2001 | Fukuoka | F24H 1/009 165/175 |
| 6,327,427 | B1 * | 12/2001 | Burkett | F24H 3/062 392/369 |
| 6,946,628 | B2 * | 9/2005 | Shirlin | G03F 7/0047 219/543 |
| 6,965,731 | B2 * | 11/2005 | Huang | F24H 3/002 392/373 |
| 7,582,347 | B2 * | 9/2009 | Tuma | A44B 18/0003 219/528 |
| 7,667,164 | B2 * | 2/2010 | Bohlender | F24H 3/0405 219/483 |
| 7,716,815 | B2 * | 5/2010 | Kim | H05B 3/347 219/515 |
| 7,971,799 | B2 * | 7/2011 | Colette | B60H 1/2225 165/41 |
| 8,283,612 | B2 * | 10/2012 | Keite-Telgenbuescher | B60R 1/0602 219/203 |
| 8,288,693 | B2 * | 10/2012 | Weiss | H05B 3/342 219/528 |
| 9,036,986 | B2 * | 5/2015 | Amberson | F24H 3/0411 219/494 |
| 9,511,648 | B2 * | 12/2016 | Gu | H05B 3/20 |
| 10,022,177 | B2 * | 7/2018 | Ide | A61B 18/085 |
| 2009/0057295 | A1 * | 3/2009 | Han | H05B 3/84 219/538 |
| 2012/0061365 | A1 | 3/2012 | Okamoto et al. | |
| 2012/0267354 | A1 | 10/2012 | Okamoto et al. | |
| 2015/0110477 | A1 | 4/2015 | Ota et al. | |
| 2016/0059669 | A1 | 3/2016 | Sagou et al. | |

FOREIGN PATENT DOCUMENTS

| | | |
|---|---|---|
| JP | 2010052710 A | 3/2010 |
| JP | 2012056531 A | 3/2012 |
| JP | 2012228896 A | 11/2012 |
| JP | 2014000944 A | 1/2014 |
| JP | 2014003000 A | 1/2014 |
| JP | 2014082126 A | 5/2014 |
| JP | 2014189251 A | 10/2014 |

* cited by examiner

RADIANT HEATER

CROSS REFERENCE TO RELATED APPLICATION

This application is a U.S. National Phase Application under 35 U.S.C. 371 of International Application No. PCT/JP2015/002231 filed on Apr. 24, 2015 and published in Japanese as WO 2016/013136 A1 on Jan. 28, 2016. This application is based on and claims the benefit of priority from Japanese Patent Application No. 2014-149054 filed on Jul. 22, 2014. The entire disclosures of all of the above applications are incorporated herein by reference.

TECHNICAL FIELD

The present disclosure relates to a radiant heater which warms an object by heat radiation.

BACKGROUND

Patent Literature 1 to Patent Literature 4 disclose radiant heaters. The apparatuses are disposed in a vehicle compartment to face a passenger.

CITATION LIST

Patent Literatures

[Patent Literature 1] JP2012-56531A
[Patent Literature 2] JP2012-228896A
[Patent Literature 3] JP2014-944A
[Patent Literature 4] JP2014-3000A

SUMMARY

Apparatuses are effective as apparatuses which give passenger a warm feeling, in order to assist a heating apparatus for vehicle. However, the structures disclosed in Patent Literature 3 or Patent Literature 4 are required to have heat radiation parts for emitting radiant heat. This heat radiation part has a disadvantage to increase a heat capacity of the radiant heater. In addition, the heat radiation part may produce a disadvantage in a manufacturing process, and a disadvantage in a price. As it is explained, the radiant heater still needs further improvements.

It is an object of the present disclosure to provide a radiation heater which can reduce a temperature of a part which contacts with an object.

It is another object of the present disclosure to provide a radiation heater which can avoid that the temperature of the part in contact with an object is maintained at a high temperature over a long period of time.

It is another object of the present disclosure to provide a radiation heater which can suppress an approaching to a high temperature portion.

A plurality of disclosures in this specification employ the following technical means, in order to attain the above-mentioned object. The symbols in the parenthesis indicated in the above section and the claim merely show correspondence relations with concrete elements described in embodiments later mentioned as one example, and are not intended to limit the technical scope of this disclosure.

One disclosure provides a radiant heater. The radiant heater comprises: a substrate part formed by electrical insulation material to provide a surface; and a heating part which is supported by the substrate part to extend along the surface, and emits radiant heat by generating heat in response to power supply, wherein the heating parts are set to reach a radiation temperature for emitting the heat radiation which makes a human to feel warmth, and wherein a pair of electrodes supported by the substrate part to be extended along the surface, wherein the heating part includes a plurality of heating wires which are made by material with specific resistance higher that the electrodes, and are connected on series at the least partially between the pair of electrodes, and wherein the plurality of heating wires are electrically connected in parallel at least partially between the pair of electrodes, and wherein the heating parts have a thermal resistance in a longitudinal direction which is set, when an object contacts on the surface, a temperature of the part where the object touches falls to a suppressed temperature lower than the radiation temperature.

When an object is not contacted, the radiant heater can reach a radiation temperature and can emit radiant heat towards an object. On the other hand, if an object contacts a part of radiant heater, it is possible to suppress a temperature of a part where the object contacts. Accordingly, it is possible to reduce excessive increase of the surface temperature of the contacting object.

DETAILED DESCRIPTION

Figure 1:
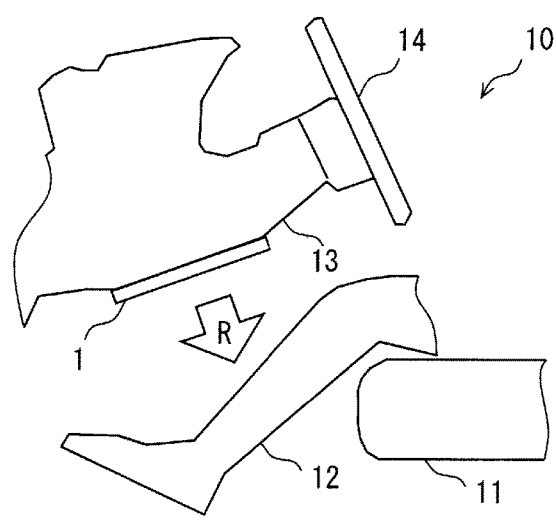
FIG. 1 is a cross sectional view of a vehicle showing a radiant heater according to a first embodiment.

A plurality of embodiments are described referring to the drawings. In the embodiments, the same parts and components as those in each embodiment are indicated with the same reference numbers and the same descriptions will not be reiterated. Components and parts corresponding to the components and parts described in the preceding description may be indicated by the same reference number and may not be described redundantly. In a case that only a part of component or part is described, other descriptions for the other embodiment may be referenced or incorporated as descriptions for the remaining part of component or part.

(First Embodiment)

In FIG. 1, the radiant heater 1 according to a first embodiment is mounted on an interior of a room of movable bodies, such as a road vehicle, a marine vessel, and an aircraft. The device 1 provides a part of a heating apparatus 10 for the interior of the room. The device 1 is an electric heater which generates heat in response to electric power supply from a power source, such as a battery, a generator, etc. which are carried in the movable body. The device 1 is formed in a shape of thin plate. The device 1 generates heat by being supplied with electric power. The device 1 emits a heat radiation R mainly towards a direction vertical to a surface thereof, in order to warm an object positioned in the direction vertical to the surface.

In the room, a seat 11 for a passenger 12 to sit down is installed. The device 1 is disposed in the room to emit the heat radiation R to feet of the passenger 12. The device 1 can be used as an apparatus for providing warm feeling immediately to the passenger 12 at a stage immediately after starting of the heating apparatus 10. The device 1 is disposed on a wall of the room. The device 1 is disposed so that the device 1 faces the passenger 12 in an assumed usual posture. For example, the road vehicle has a steering column 13 for supporting a handle 14. The device 1 may be disposed on an underside of the steering column 13 to face the passenger 12. The device 1 is disposed so that a front surface is exposed towards an interior of a room. The device 1 is substantially exposed to the room, without having a covering member for preventing that the passenger 12 touches the surface of the device 1 directly.

Figure 2:
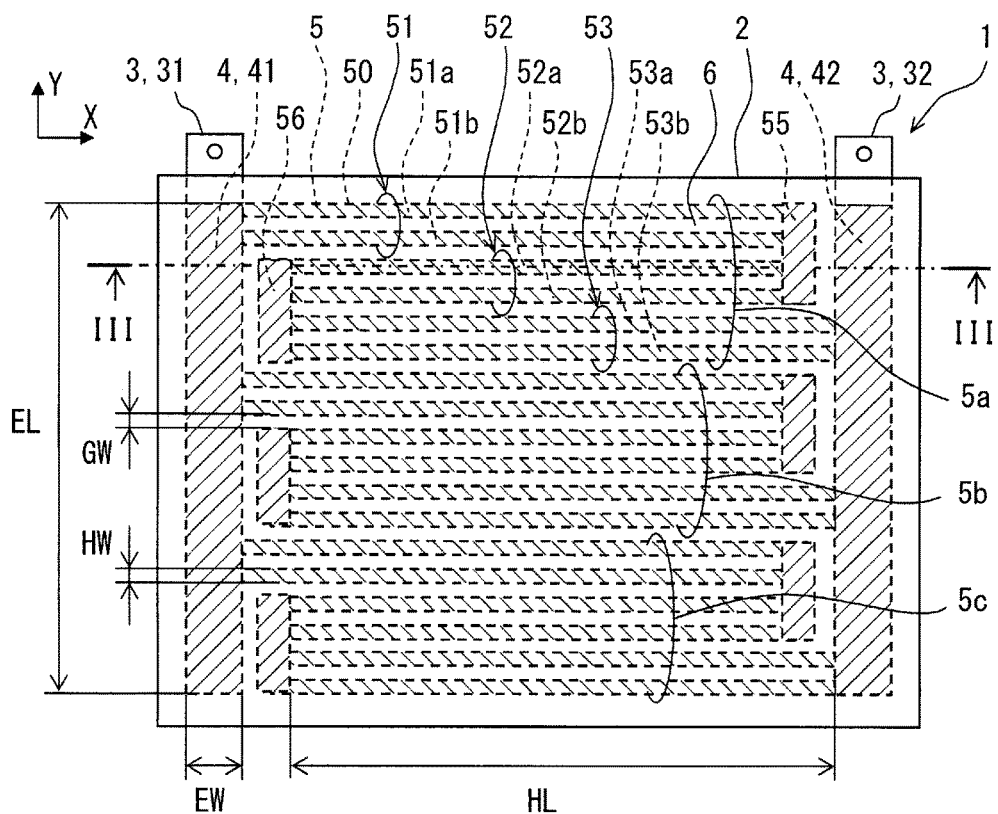
FIG. 2 is a plan view of the radiant heater according to the first embodiment.

In FIG. 2, the device 1 spreads over an X-Y plan defined by an axis X and an axis Y. The device 1 is formed in a shape of an almost square flat plate. The device 1 has a substrate part 2, a plurality of electrodes 3 and 4, and a plurality of heating parts 5. In the drawing, in order to show the electrodes 3 and 4 embedded within the substrate part 2, and the heating parts 5, hatching is attached.

Figure 3:
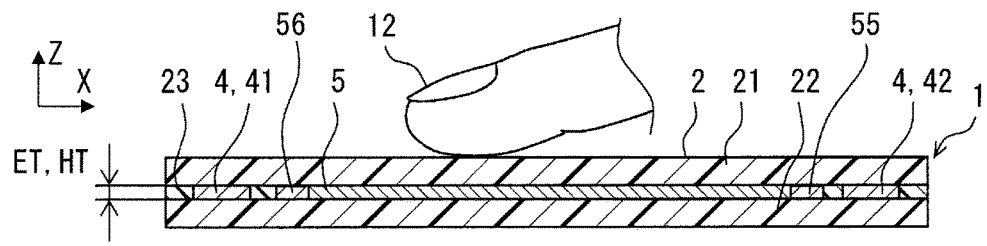
FIG. 3 is a cross sectional view on a line III-III in FIG. 2.

FIG. 3 shows a cross-section on a line III-III in FIG. 2. In the drawing, the device 1 has a thickness in a direction of an axis Z. The device 1 may also be called a plate shaped heater which emits a heat radiation R mainly towards a direction vertical to the surface.

The substrate part 2 is made of a resin material which provides fine electrical insulation properties and withstands in elevated temperature. The substrate part 2 provides the surface. The substrate part 3 is formed in a shape of a flat plate. The substrate part 3 is given a curved surface corresponding to a surface of an attached wall. The substrate part 3 has the rigidity which can maintain the configuration. The substrate part 3 can have the flexibility for enabling deformation to fit on the surface of the wall. The substrate part 2 may be made with thermoplastic resin. The substrate part 2 is a multilayer substrate.

The substrate part 2 has a surface layer 21, a back layer 22, and a middle layer 23. These layers 21, 22, and 23 are provided with sheets of thermoplastic resin. The surface layer 21 faces toward a radiation direction of the heat radiation R. In other words, in a disposed condition of the device 1, the surface layer 21 provides a surface which is disposed to face a part of the passenger 12 who is an object for heating. A surface of the surface layer 21 is exposed towards the interior of a room. The back layer 22 provides a back surface of the device 1. The middle layer 23 is disposed between the surface layer 21 and the back layer 22. Material which form the electrodes 3 and 4 and the heating parts 5 is supported on one or more of the above-mentioned layers 21, 22, and 23. The substrate part 2 is a member for supporting the electrodes 3 and 4, and the heating parts 5.

Material which provides the substrate part 2 provides the thermal conductivity lower enough than that of the electrodes 3 and 4 and the heating parts 5. The substrate part 2 provides a heat insulation part which reduces the heat conduction between two adjoining heating parts 5.

The plurality of electrodes 3 and 4 have external electrodes 3 which at least a portion exposes to the exterior of the device 1, and internal electrodes 4 embedded within the substrate part 2. The electrodes 3 include a pair of electrodes 31 and 32 for supplying electric power. The pair of electrodes 31 and 32 provide the terminal of the device 1. These electrodes 3 are arranged on the outer surface of the substrate part 2 including an outer rim portion, a front surface and a back surface of the substrate part 2. Some electrodes 3 are embedded within the substrate part 2, and are electrically connected with the electrodes 4. The electrodes 4 may be exposed on the outer surface of the substrate part 2, and may be used as terminals for supplying electrodes.

The electrodes 4 are embedded within the substrate part 2. The electrodes 4 are also bus-bar parts which distribute electric power to the plurality of heating parts 5 mentioned later. The electrodes 4 are extended from the electrodes 3. The electrodes 4 have an electric resistance value low enough compared with the plurality of heating parts 5. The electric resistance value of the electrodes 4 is set to reduce heat generation on the electrodes 4. The electrodes 4 distribute current evenly to the plurality of heating parts 5 connected to the electrodes 4.

The heating parts 5 are embedded within the substrate part 2. The heating part 5 is arranged between the surface layer 21 and the back layer 22. Therefore, the heating parts 5 are not exposed to the surface of the substrate part 2. The heating parts 5 are protected by the substrate part 2. The surface layer 21 permits radiation of radiant heat from the heating part 5, while protecting the heating part 5.

The heating parts 5 are formed in thin plate shapes parallel to the surface of the substrate part 2. The heating parts 5 can emit the heat radiation R by heat supplied by power supply. The heating parts 5 can emit the heat radiation R which may make the passenger 12, i.e., a person, to feel warmth, when heated to a predetermined radiation temperature Tr. Volume of one of the heating parts 5 is set so that the heating part 5 can reach the temperature at which the heating part 5 can emit the heat radiation R by the thermal energy supplied from the heating parts 5. The volume of the heating part 5 is set so that the temperature of the heat radiating part 3 may rise quickly with the thermal energy supplied from the heating parts 5. The volume of the heating part 5 is set small so as to produce rapid temperature lowering by heat dissipation to the object which contacts on the surface of the device 1. The thickness of the heating part 5 is set thin in order to maximize area parallel to the surface and to minimize the volume. The area of the heating part 5 is set to an area suitable to emit the heat radiation R. The area of the heating part 3 is set smaller than a part of the object, e.g., the passenger 12, positioned to face the surface of the device 1.

The heating part 5 has a plurality of heating wires 50. The heating wire 50 is straightly extended along the front surface of the substrate part 2. The heating wire 50 has a configuration which can be called a thin and slender belt or a line. The heating wire 50 can be called a ribbon shaped heating element or a wire heater. The heating wire 50 is straightly extended in linear shape along the front surface of the substrate part 2. One end of the heating part 50 is connected to one electrode 4 electrically. The other end of the heating part 50 is connected to the other electrode 4 electrically.

The plurality of heating wires 50 are arranged in parallel each other. The plurality of heating wires 50 are arranged to define and form clearances 6 between them. The plurality of heating wires 50 are arranged in an almost evenly distributed manner with respect to the front surface of the substrate part 2. The plurality of heating wires 50 are arranged to be distributed in an almost even density within a region between the pair of electrodes 41 and 42. The plurality of heating wires 50 are arranged dispersively over almost all unit region of the substrate part 2. Each of the plurality of heating wires 50 provides the minimum unit of the heating part 5.

The electrodes 4 have a pair of electrodes 41 and 42 for supplying electric power. A pair of electrodes 41 and 42 can be called a trunk electrode. The pair of electrodes 41 and 42 are arranged separately with each other on both ends of a unit region of the substrate part 2. The pair of electrodes 41 and 42 are extended along both sides of the unit region of the substrate part 2. A region where the pair of electrodes 41 and 42 are disposed and a region between them define the unit region. The device 1 may be constituted to have a plurality of unit territories.

The device 1 has a plurality of heating belts 5*a*, 5*b*, and 5*c*. The device 1 may be constituted to have at least one of the heating belts. The plurality of heating belts 5*a*, 5*b*, and 5*c* are connected in electrically parallel between the pair of electrodes 41 and 42. The electrodes 41 and 42 may also be called a parallel-connection part which connects in parallel the plurality of heating belts 5*a*, 5*b*, and 5*c* or the plurality of heating wires 50 which are contained in them. The plurality of heating elements 5*a*, 5*b*, and 5*c* have the same structure. In the drawings, three heating belts are illustrated. The plurality of heating belts 5*a*, 5*b*, and 5*c* arranged among the electrodes 41 and 42 enable other heating belts function, even if an open circuit is created in one heating belt. Hereafter, the heating belt 5*a* is explained.

One heating belt 5*a* has the plurality of heating wires 50. One heating belt 5*a* has at least one of the electrodes 55 and 56 which electrically connect at least two of the heating wires 50 in a series manner. In a functional viewpoint, the electrodes 55 and 56 may be seen as components belonging to the heating belt 5*a*. In a material viewpoint, the electrodes 55 and 56 are the same as the electrodes 41 and 42, therefore, may be seen as components belonging to the electrode 4. The electrodes 55 and 56 are arranged on a close location to the electrodes 41 and 42, but are apart from the electrodes 41 and 42, respectively. In one of the heating belt 5*a*, the plurality of heating wires 50 are arranged in parallel each other. In one of the heating belt 5*a*, the plurality of heating wires 50 are electrically connected in series at least partially. In one of the heating belt 5*a*, the plurality of heating wires 50 are electrically connected in parallel at least partially. In one of the heating belt 5*a*, the plurality of heating wires 50 are arranged in a winding manner.

In the illustrated example, the heating belt 5*a* has a plurality of heating wires 51*a*, 51*b*, 52*a*, 52*b*, 53*a*, and 53*b*. One end of the plurality of heating wires 51*a* and 51*b* are connected to the electrode 41. The other one end of the plurality of heating wires 51*a* and 51*b* are connected to the electrode 55. The plurality of heating wires 51*a* and 51*b* are connected in electrically parallel between the electrodes 41 and 55. One end of the plurality of heating wires 52*a* and 52*b* are connected to the electrode 56. The other one end of the plurality of heating wires 52*a* and 52*b* are connected to the electrode 55. The plurality of heating wires 52*a* and 52*b* are connected in electrically parallel between the electrodes 55 and 56. One end of the plurality of heating wires 53*a* and 53*b* are connected to the electrode 56. The other one end of the plurality of heating wires 53*a* and 53*b* are connected to the electrode 42. The plurality of heating wires 53*a* and 53*b* are connected in electrically parallel between the electrodes 56 and 42.

The plurality of heating wires 51*a* and 51*b* are also called a parallel group 51. The plurality of heating wires 52*a* and 52*b* are also called a parallel group 52. The plurality of heating wires 53*a* and 53*b* are also called a parallel group 53. Therefore, the heating belt 5*a* has a plurality of parallel groups 51, 52, and 53. The parallel group 51 and the parallel group 52 are electrically connected in series by the electrode 55. The parallel group 52 and the parallel group 53 are electrically connected in series by the electrode 56. Therefore, the plurality of parallel groups 51, 52, and 53 are electrically connected in series by the electrodes 55 and 56. The plurality of heating wires contained in one parallel group enable the other heating wire functions, even if an open circuit is created in one heating wire in one parallel group.

The electrodes 55 and 56 connect among a plurality of heating wires 50. The electrodes 55 and 56 may be called middle electrodes. The electrodes 55 and 56 provide connecting parts which connect the plurality of heating wires 50 in parallel and/or in series. The connecting parts which electrodes 55 and 56 provide connect the plurality of parallel groups 51, 52, and 53 in series while forming the plurality of parallel groups 51, 52, and 53 by connecting at least two heating wires 50 in parallel. The electrodes 55 and 56 may also be called series-parallel-connection parts which connect the plurality of heating wires 50 in parallel and in series. The electrodes 55 and 56 electrically connect the plurality of heating wires 50 in parallel. The electrodes 55 and 56 electrically connect the plurality of heating wires 50 in series. In other words, the plurality of heating wires 50 are connected in series by the connecting parts 55 and 56 formed of the same material as the electrodes 41 and 42. The plurality of heating wires 50 are connected in series at least in a part on the device 1. Therefore, it can be said that the plurality of heating wires 50 are connected in series at least partially.

For example, the electrode 55 electrically connects two heating wires 51*a* and 51*b* in parallel. Simultaneously, the electrode 55 electrically connects two heating wires 52*a* and 52*b* in parallel. The electrode 55 also connects two heating wires in electrically series. For example, the electrode 55 electrically connects between the heating wire 51a, and the heating wires 52a or the heating wires 52b in series. The electrode 55 electrically connects between the heating wire 51b, and the heating wires 52a or the heating wires 52b in series.

The electrodes 55 and 56 are arranged on a side end of the plurality of heating wires 50 arranged in parallel each other. The electrodes 55 and 56 change on the substrate part 2 a current flowing direction in one heating wire 50 which is connected in series by it, and a current flowing direction in the other heating wire 50 which is connected in series. In the illustrated example, the electrodes 55 and 56 reverse a current flowing direction. In other words, the electrodes 55 and 56 are arranged at turn parts where current changes flowing direction. The electrodes 55 and 56 may be called turn electrodes. The straight heating wire 50 contributes to suppress concentration of current on the heating wire 50. In addition, the electrodes 55 and 56 contribute to suppress concentration of current at the turn parts.

Shapes and dimensions which define cross-sectional area with respect to an electric current direction of the electrodes 3, 4, 55 and 56, and material of the electrodes 3, 4, 55 and 56 are selected and set to provide a low electric resistance value. The cross-sectional area and material of electrodes 3, 4, 55 and 56 are set to provide a good electric conductor to distribute current evenly to the plurality of heating wires 50. Shapes and dimensions which define cross-sectional area with respect to an electric current direction of the heating wire 50, and material of the heating wire 50 are selected and set to provide a high electric resistance value to generate the heat radiation R by supplying power. The material of electrodes 3, 4, 55 and 56, and the material of the heating wire 50 are different materials. The electric specific resistance of the material of the electrodes 3, 4, 55 and 56 is sufficiently lower than the electric specific resistance of the material of the heating wire 50.

The electrode 4 is extended long and narrow and has a longitudinal direction along the axis Y. The heating part 4 has a length EL along the axis Y. The length EL corresponds to the electric current direction within the electrode 4. The electrode 4 has a width EW along the axis X. The width EW is perpendicular to the electric current direction. The electrode 4 has a thickness ET along the axis Z. The thickness ET is smaller than the length EL and the width EW. Therefore, the electrode 4 provides an electric conductor with a ribbon-like shape.

The heating wire 50 is extended long and narrow and has a longitudinal direction along the axis X. The heating wire 50 has a length HL along the axis X. The length HL corresponds to the electric current direction within the heating wire 50. The length HL may be the length of the longest heating wire 50, or the average length of the plurality of heating wires 50. The heating wire 50 has a width HW along the axis X. The width HW is perpendicular to the electric current direction. The heating wire 50 has a thickness HT along the axis Z. The thickness HT is smaller than the length HL and the width HW. Therefore, the heating wire 50 provides an electric conductor with a ribbon-like shape. The width HW is 1 millimeter. The width HW may be set in a range from 100 micrometers to 5 mm. It is desirable that the width HW is set smaller than 2 mm. In addition, it is desirable that the width HW is set smaller than or equal to 1 millimeter and wider than or equal to 100 micrometers.

The thickness HT is 15 micrometers. The thickness HT may be set in a range of 30 plus/minus 20 micrometers. It is desirable that the thickness HT is set smaller than the width HW (HW>HT). It is desirable that the thickness HT is set smaller than 1 mm. It is desirable that the thickness HT is set smaller than 100 micrometers.

The width EW is set greater than the width HW in order to reduce the electric resistance value in the electrode 4. In this embodiment, a cross-sectional area of the electrode 4 perpendicular to the electric current direction is larger than a cross-sectional area of the heating parts 5 perpendicular to the electric current direction.

The specific resistance of the electrodes 4 smaller than the specific resistance of the heating wire 50 makes it possible to reduce the cross-sectional area of the electrodes 4. For the same purpose, a thickness ET may be set greater than a thickness HT.

The clearance 6 has a width GW. A length of the clearance 6 is the same as the length HL of the heating wire 50. The plurality of heating wires 50 and the plurality of clearances 6 are arranged alternately over entire length EL of the electrode 4. The width GW of the clearance 6 may be set equally to the width HW of the heating wire 50. Thereby, the plurality of heating wires 50 are arranged in an evenly distributed manner. In addition, the heating wires 50 and the clearances 6 with the small width HW and GW are arranged with high density. As a result, a temperature distribution on the surface of the radiant heater device 1 is reduced. Such high-density arrangement of small heating wires 50 contributes to emit uniform heat radiation R from the surface of the radiant heater device 1.

In this embodiment, the radiant heater device 1 is formed in a thin plate shape. The electrodes 3, 4, 55 and 56, and the heating wires 50 which are embedded within the substrate part 2 are film-like shapes which spread in parallel with the surface of the substrate part 2. Such film-like electrodes 3, 4, 55 and 56 and the heating wires 50 are advantageous to emit heat radiation R over large area.

The heating parts 5 are made by material which generates heat by being supplied electric power. The heating wires 50 demonstrate electric resistance along with the electric current direction so as to generate heat by being supplied power. The heating wires 50 may be made of metal material. The heating wires 50 may be made of tin alloy. The heating wires 50 may be made of alloy containing copper, silver, and tin. In addition, the heating wires 50 may be made of materials for heater wire, such as a stainless alloy, a nickel-chromium alloy or an aluminum alloy.

The electrodes 3, 4, 55 and 56 are made by material having a specific resistance lower than that of the material of the heating wires 50. The electrodes 3, 4, 55 and 56 are made by material that generates fewer calories than that of the heating wire 50 when it is supplied with electric power. The electrodes 3, 4, 55 and 56 are made by material with low specific resistance so that a current can be evenly distributed to the plurality of heating wires 50. The electrodes 3, 4, 55 and 56 may be made of metal material. The electrodes 3, 4, 55 and 56 may be made of tin alloy. The electrodes 3, 4, 55 and 56 may be made of alloy containing copper, silver, and tin. In addition, the electrodes 3, 4, 55 and 56 may be made of materials with good conductivity, such as a copper alloy or an aluminum alloy.

The electrodes 4, 55 and 56 and the heating wires 50 are connected electrically. The electrodes 4, 55 and 56 and the heating wires 50 are connected by sintering. At least one of the electrodes 4, 55 and 56 or the heating wires 50 is provided with an alloy containing tin. In a manufacturing process of the device 1, the material which provides the substrate part 2, the electrodes 4, 55, and 56, and the heating wires 50 are heated under pressure. In this manufacturing process, the electrodes 4 and the heating wires 50 are unified by sintering. For example, the electrodes 4, 55 and 56 is provided by a copper foil, and the heating wires 50 may be provided by a powder layer containing tin and silver. The powder layer can be provided by a paste layer containing tin powder, silver powder, and binder resin. The powder layer is alloyed under heat and provides the heating wires 50 which are an alloy unified by sintering. In the process which alloys the powder layer, a solid phase diffusion layer is formed between the powder layer and the copper foil. As a result, the copper foil which provides the electrodes 4, 55 and 56, and the powder layer which provides the heating wires 50 are connected electrically and mechanically by sintering.

Alternatively, the electrodes 4, 55 and 56 may be provided by a powder layer containing tin and silver, and the heating wires 50 may be provided by a thin film of heater wire material. Alternatively, the electrodes 4, 55 and 56 may be provided by a copper foil, the heating part 5 may be provided by a thin film of heater wire material, and a powder layer containing tin and silver may be disposed between them as a connecting member.

The plurality of heating wires 50 form conducting paths connected in parallel between the pair of electrodes 41 and 42. As a predetermined voltage, e.g., DC 12V, is supplied to the electrodes 31 and 32, the plurality of heating wires 50 generate heat by the current flowing through the plurality of heating wires 50. When the plurality of heating wires 50 generate heat, heat radiation R is provided from the surface of the device 1. A temperature of the plurality of the heating wires 50 increases rapidly more than a temperature increase of room air resulting from the heating apparatus. As a result, it is possible to give warmth to the passenger 12 by heat radiation R quicker than the heating effect of the heating apparatus.

Volume of the electrodes 4 and the heating parts 5 (including the heating wires 50 and the electrodes 55 and 56) is set to decrease heat capacity thereof. The heat capacity of the heating part 5 is set so that a temperature of a portion where the object contacts falls in a short period of time after the object contacts on the surface of the radiant heater device 1 at a portion above the heating part 5. The heat capacity of the heating part 5 is set so that a surface temperature of the radiant heater device 1 at the contacting portion falls lower than a predetermined temperature in a short period of time after the object contacts on the surface of the radiant heater device 1. In the preferred embodiment, the heat capacity of the heating part 5 is set, in a case that a finger of human contacts on the surface of the radiant heater device 1, so that the surface temperature of the contacting portion falls lower than 60 degrees Celsius within 1.0 seconds after the contact. In the preferred embodiment, the heat capacity of the heating part 5 is set, in a case that a finger of human contacts on the surface of the radiant heater device 1, so that the surface temperature of the contacting portion falls lower than 60 degrees Celsius within 0.32 seconds after the contact.

In the preceding embodiments, the specification of the radiant heater 1, e.g., the dimension of each part, the performance, and material can be set based on a thermal model. The specification of the radiant heater 1 is set to realize a necessary thermal-energy supply in condition that no object contacts on the surface of the radiant heater 1. Furthermore, the specification of the radiant heater 1 is set in condition that an object contacts on the surface of the radiant heater 1, so that a surface temperature of the radiant heater 1 may fall at least to a temperature which does not damage the object. The specification of the radiant heater 1 is set to satisfy both two above-mentioned cases. For example, a cross-sectional area CA perpendicular to the longitudinal direction of the heating part 5 can be set based on the thermal conduction model.

Figure 4:
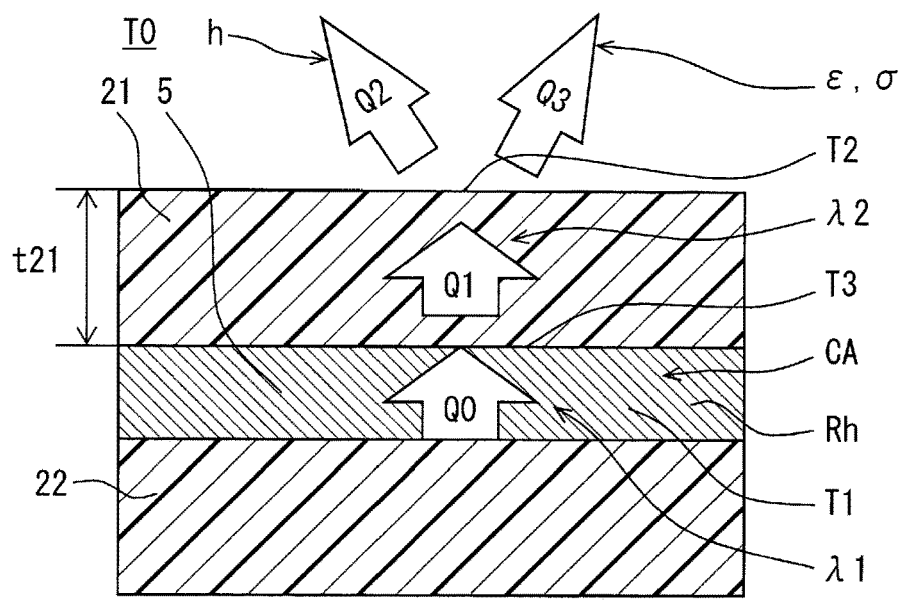
FIG. 4 is a partial cross sectional view showing a thermal conduction model of the radiant heater.

FIG. 4 shows a thermal conduction model in a condition where no object contacts on the radiant heater 1. In this thermal conduction model, a heat flow which goes to the surface (top face) of the radiant heater 1 among the thermal energy which the heating parts 5 can generate is modeled.

In the drawing, it is assumed that a heat generation amount of the heating part 5 per unit area on the surface of the radiant heater 1 is Q0. Q0 may be calculated based on the material of the heating part 5, the dimension of the heating part 5, and the current flowing through the heating part 5. The heating part 5 has a cross-sectional area CA at a cross section which intersects perpendicularly the longitudinal direction. A temperature of the heating part 5 is T1. A temperature of the surface on the surface layer 21 is T2. A thermal conductivity in the heating part 5 is assumed as "lambda1". A heat transfer coefficient between the heating part 5 and the surface of the surface layer 21 is assumed as "lambda1". A thickness of the surface layer 21 is t21. A heat transfer amount Q1$t$ (W/m^2) transferred to the surface of the surface layer 21 can be expressed by the following expression (1).

[Math 1]
$$Q1 = \frac{\lambda 2}{t21} \cdot (T1 - T2) \tag{1}$$

Heat dissipation from the surface of the radiant heater 1 is made mainly by the convection and the radiation. A heat transfer coefficient by free convection is assumed as "h". A temperature of air is T0. The heat dissipation amount Q2 (W/m^2) by the convection can be expressed by the following expression (2).
[Math 2]
$$Q2 = h \cdot (T3 - T0) \tag{2}$$

Here, an emissivity from the surface of the radiant heater 1 is denoted by epsilon (Epsilon), and the Stefan-Boltzmann constant is denoted by sigma (sigma). A heat dissipation amount Q3 by the radiation can be expressed by the following expression (3)
[Math 3]
$$Q3 = \varepsilon \cdot \sigma \cdot (T2^4 - T0^4) \tag{3}$$

When the radiant heater is operated stably by being supplied with the rated power, Q0=Q1=Q2+Q3 is realized. At this time, the surface temperature T2 is stable at a necessary temperature. A specification of the radiant heater device 1 is set so that the surface temperature T2 reaches to the radiation temperature Tr which can supply a necessary heat radiation R. The radiation temperature Tr is a predetermined temperature not less than 60 degrees Celsius for example.

Figure 5:
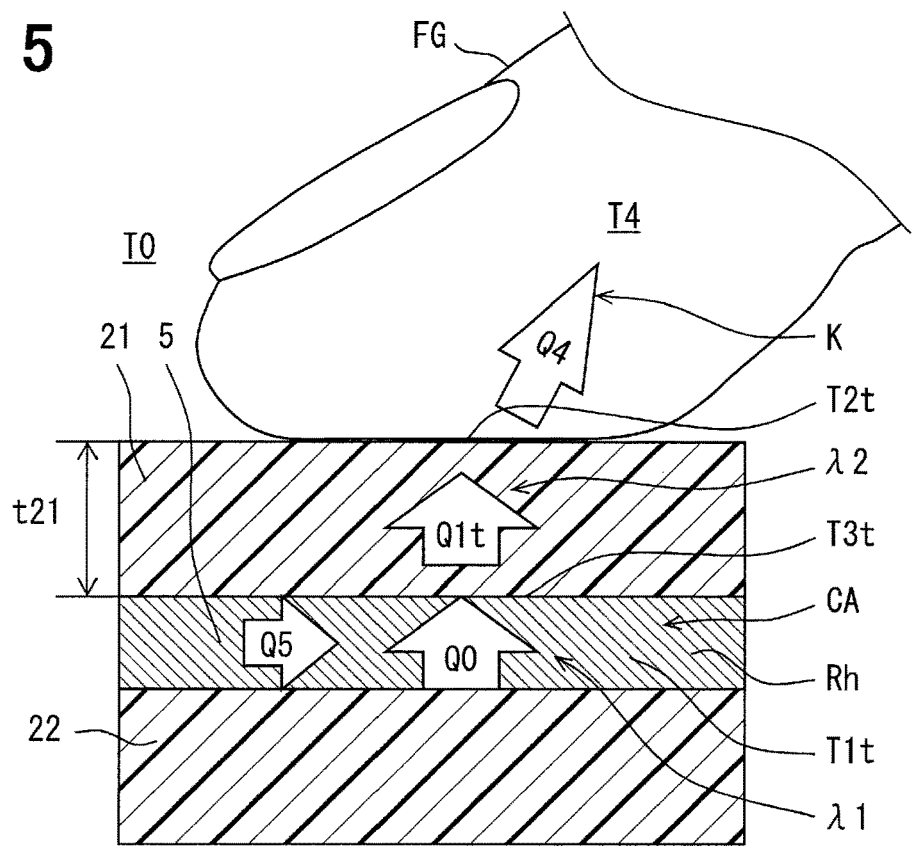
FIG. 5 is a partial cross sectional view showing a thermal conduction model of the radiant heater.

FIG. 5 shows the thermal conduction model in a condition where a second human finger FG contacts the radiant heater device 1. As an object contacts the surface of the radiant heater device 1, the convection and the radiation are impeded at least partially. At least a part of heat dissipation from the surface of the radiant heater device 1 is provided by the heat transfer to the contacting object. Thus, as the object contacts, a thermal balance in the radiant heater device 1 is changed. The temperature of the heating part 5 becomes T1$t$.

The temperature of the surface of the surface layer 21 becomes T2t. The heat transfer amount Q1t transferred to the surface of the surface layer 21 can be expressed by the following expression (4).

[Math 4]

$$Q1t = \frac{\lambda 2}{t21} \cdot (T1t - T2t) \qquad (4)$$

The overall heat transfer coefficient of the contacting object is denoted by K. An internal temperature of contacting object is T4. An amount of heat Q4 dissipated from the surface directly under the contacting object, i.e., an amount of heat Q4 absorbed by the contacting object can be expressed by the following expression (5).

[Math 5]

$$Q4 = K \cdot (T2t - T4) \qquad (5)$$

The surface temperature falls to T2t from T2 as the object contacts thereon. The temperature of the heating part 5 directly under the contacting portion also falls to T1t from T1. Due to a temperature lowering resulting from contact, thermal energy flow in a lateral direction is generated. The heating part 5 is surrounded by the substrate part 2 of which heat transfer coefficient is much lower. Therefore, an amount of heat passing through the heating part 5 becomes dominant in the thermal energy flow in a lateral direction. The thermal resistance in the lateral direction of the heating part 5, i.e., in the longitudinal direction of the heating part 5 is assumed as "Rh". A temperature of the heating part 5 which is positioned on a surrounding area and have no temperature lowering is assumed as T3t. The heat transfer amount Q5 which passes through in parallel to the surface of the radiant heater device 1, i.e., the heating part 5 in the lateral direction, can be expressed by following expression (6).

[Math 6]

$$Q5 = 2 \times \frac{1}{Rh} \cdot (T2t - T3t) \qquad (6)$$

A length of the heating part 5 is assumed as HL. The thermal resistance Rh (K/W) about the longitudinal direction of the heating part 5 can be expressed by following expression (7).

[Math 7]

$$Rh = \frac{HL}{\lambda 1 \cdot CA} \qquad (7)$$

When the rated power is supplied to the radiant heater 1, an object of something may contact a portion of the surface of the radiant heater 1. In this case, the surface temperature T2 falls due to an amount of heat which the object carries away. Then, a thermal balance is obtained at the contacting portion, Q0+Q5=Q1t=Q4 is realized. At this time, the surface temperature T2t is stable at a temperature lower than the radiation temperature Tr. A specification of the radiant heater 1 is set so that the surface temperature T2t reaches to a suppressed temperature Tp which is capable of protecting the contacting object. For example, the material defining the thermal resistance Rh and the cross-sectional area Ca may be used as variable factors. The material and the cross-sectional area CA of the heating part 5 are set to make the surface temperature T3 reaches to the suppressed temperature Tp. The suppressed temperature Tp is a predetermined temperature less than 50 degrees Celsius, for example.

In a case that the contacting object has sufficient heat dissipation function, the contacting object can carry away a predetermined amount of heat. For example, in a case that a part of human, e.g., a finger contacts on, heat can be carried away by the blood flow. An amount of heat which the contacting object is capable of carrying away is QH. By realizing Q1t=Q4<QH, the surface temperature T2t converges to a temperature which is higher than a temperature of a part of a human, i.e., a body temperature, but is close to a body temperature. In a case that assuming a part of human contacts on, the suppressed temperature Tp may be set not greater than 40 degrees Celsius. In this case, suppressed temperature is a body temperature mostly.

Figure 6:
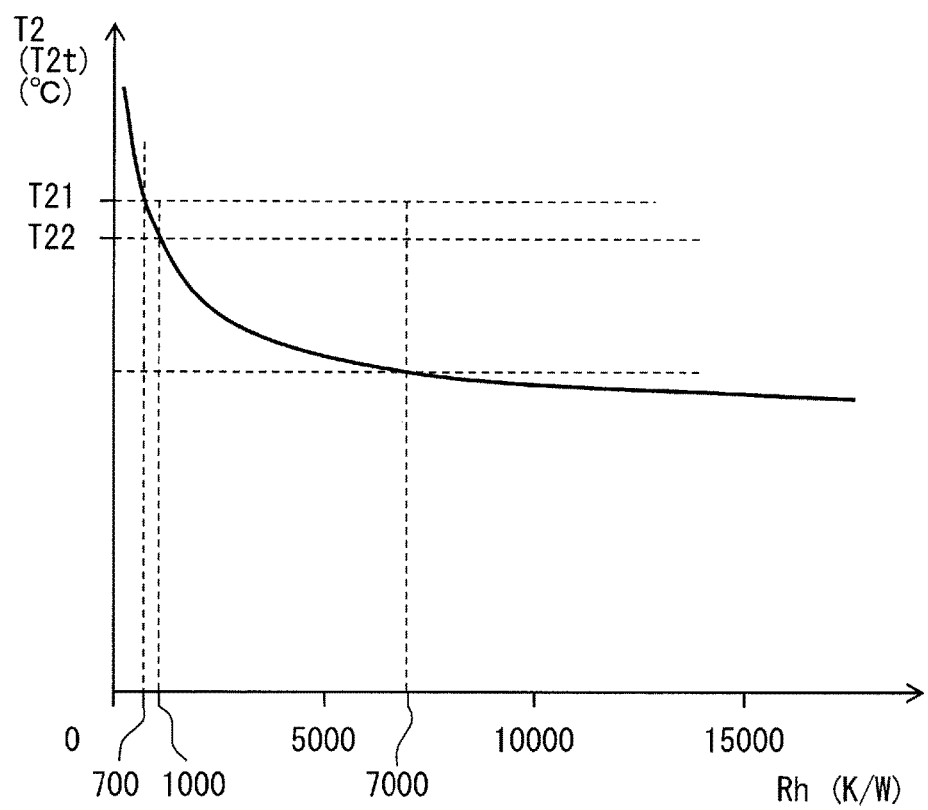
FIG. 6 is a graph showing a characteristic between a thermal resistance and a temperature according to the first embodiment.

In FIG. 6, a horizontal axis shows the thermal resistance Rh (K/W) in the longitudinal direction of the heating part 5. A vertical axis shows the surface temperature T2 of the radiant heater 1. The vertical axis also shows the surface temperature T2t in the condition where an object contacts thereon. As illustrated, since the heating part 5 is formed so that the thermal resistance Rh exceeds a predetermined value, the surface temperature T2t is reduced to be less than predetermined temperatures T21 and T22. Here, the thermal resistance Rh can be expressed by following expression (8) by using the length L (m) of the heating part, the thermal conductivity lambda1 (W/m-K) in the longitudinal direction of the heating part, and the cross-sectional area CA (m^2) perpendicular to the longitudinal direction of the heating part.

[Math 8]

$$Rh = \frac{L}{\lambda 1 \cdot CA} \qquad (8)$$

For example, in order to keep it less than the predetermined temperature T21, the thermal resistance Rh can be set to more than 700 (K/W). It is desirable that the thermal resistance Rh is set to more than 1000 (K/W) in order to keep it less than the predetermined temperature T21. The thermal resistance Rh can be set to still higher value, e.g., 7000 (K/W).

The predetermined temperature T21 and T22 can be set so that no trace resulting from a thermal energy is formed on the contacted object. In addition, in a case that a human is assumed as an object that may contacts thereon, the predetermined temperatures T21 and T22 may be set so that the human can allow hotness of the perceived heat, or the human can withstand hotness of the perceived heat.

Figure 7:
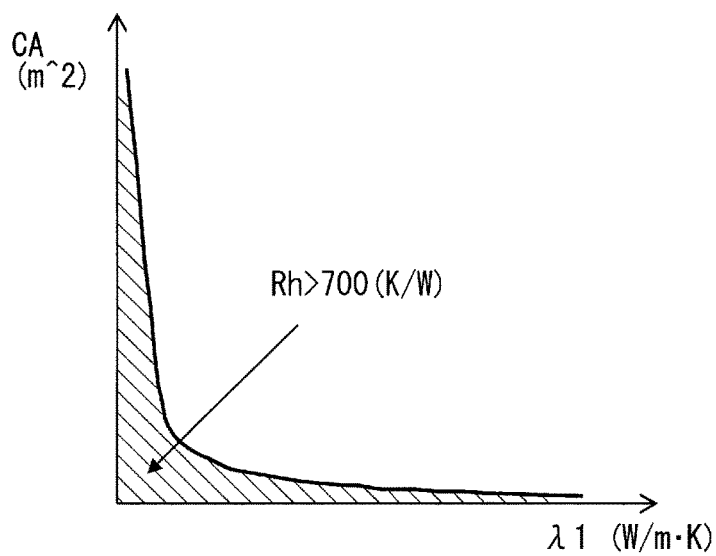
FIG. 7 is a graph showing a characteristic between a thermal conductive rate and a cross sectional area according to the first embodiment.

In FIG. 7, a horizontal axis shows the heat transfer coefficient lambda1 (W/m-K) in the longitudinal direction of the heating part 5. A vertical axis shows the cross-sectional area CA (m^2) which intersects perpendicularly with the longitudinal direction of the heating part. In the drawing, a territory where the thermal resistance Rh exceeds 700 (K/W) (Rh>700 (K/W)) is shown by hatchings, and a boundary is shown by the solid line. The cross-sectional area CA of the heating part 5 is set according to the heat transfer coefficient lambda, i.e., the material, of the heating part 5 to realize the target thermal resistance Rh.

For example, the cross-sectional area CA may be set about 300 micrometers×30 micrometers. In addition, the cross-sectional area CA may be set less than 2500 micrometer^2. In a case that the heating part 5 has a round cross section, the diameter may be set less than 500 micrometers.

Figure 8:
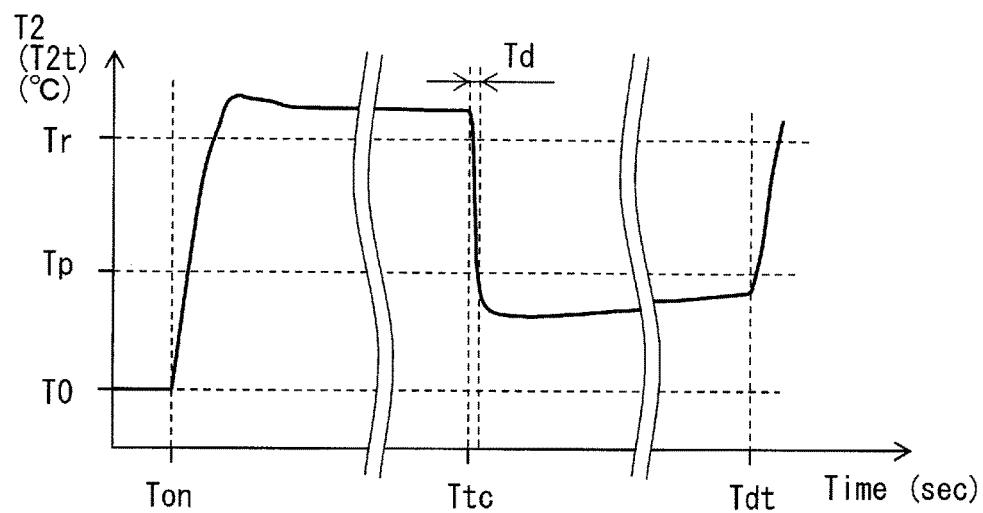
FIG. 8 is a wave form chart showing an example of operation according to the first embodiment.

An example of operation of the first embodiment is illustrated in FIG. 8. In time Ton, power supply to the radiant heater device 1 is started. The surface temperature T2 rises rapidly from the room temperature T0 immediately after a start of power supply. The surface temperature T2 reaches rapidly the radiation temperature Tr which can emit heat radiation R. Thereby, a quick starting characteristic is acquired. Temperature rising after a start of power supply is significantly quicker than a rising of air temperature by the heating apparatus. Accordingly, the radiant heater device 1 is effective as a quick heating apparatus.

In time Ttc, an object contacts on the surface of the radiant heater 1. The contacted object takes a thermal energy from the radiant heater 1. At this time, the radiant heater 1 has the substrate part 2, the electrodes 3 and 4, and the heating parts 5 which are formed to suppress the heat capacity in that unit area. Further, the radiant heater 1 is formed to suppress a heat transfer in a lateral direction along the front surface. In other words, the radiant heater 1 is given the high thermal resistance Rh about the lateral direction. Specifically, the heating part 5 that is a dominant with respect to the thermal resistance in the lateral direction of the radiant heater 1 is given the high thermal resistance Rh. As a result, it is possible to reduce thermal flow from the around portion into the portion where the object contacts.

As shown in the drawing, the surface temperature T2 of the radiant heater 1 falls rapidly. At this time, the surface temperature T2 falls promptly from the radiation temperature Tr to the suppressed temperature Tp. After contacting the object, the period Td during the surface temperature T2 exceeding the suppressed temperature Tp is short. Accordingly, even if a human contact, the thermal energy received per unit time is suppressed by the level which a human can permit.

In addition, during the object contacts, there is no rapid increase of the surface temperature T2. While the object contacts, the surface temperature T2 is maintained by low temperature. The surface temperature T2 increases gradually. Accordingly, even if humans contact, humans can detach the contacting part, while being in the level which can permit the thermal energy received per unit time.

In time Tdt, the object separates from the surface of the radiant heater 1. When the object separates, the heat flow from the radiant heater 1 to the object is lost. Thereby, the surface temperature T2 rises rapidly and exceeds the radiation temperature Tr again.

In this example of operation, forming a trace on the object caused by thermal energy of the radiant heater 1 is reduced during a period between a time Ttc and a time Tdt. In a case that a part of a human contacts thereon, the human may allow heat perceived, since a period Td where the surface temperature T2 exceeds the suppressed temperature Tp is short.

In this embodiment, the radiant heater 1 has the substrate part 2 which is formed by electrical insulation material to provide a surface. The radiant heater 1 has the electrodes 4 supported by the substrate part to be extended along the surface, and the heating part 5. The pair of electrodes 41 and 42 is supported by the substrate part 2 to be extended along the surface. The heating part 5 is made by material of which specific resistance is higher than that of the electrode 4 to radiate heat radiation R by generating heat in response to power supply. The heating part 5 is supported by the substrate part 2 to be extended along the surface, and is arranged between the pair of electrodes 4. The radiant heater 1 does not have a heat radiation part which spreads in the large area for emitting radiant heat. Accordingly, radiant heat radiated from the heating part 5 is emitted from a component of the heating part 5 by penetrating the surface layer 21 of the substrate part 2. This structure enables control of the heat capacity of the radiant heater 1. As a result, it is possible to reduce a temperature of the portion where the object contacts. Therefore, it is possible to avoid that a temperature of the portion where the object contacts is maintained at a high temperature over a long period of time.

The substrate part 2 has the surface layer 21 and the back layer 22. The electrodes 3 and 4 and the heating parts 5 are arranged between the surface layer 21 and the back layer 22. The substrate part 2 is a plate-like shape, and the electrodes 3 and 4 and the heating parts 5 are film-like shapes spreading along the surface. Both of the electrodes 4 and the heating parts 5 are formed in a film-like shape, and the thermal capacity is reduced. As a result, a temperature of the heating parts 5 rises promptly in response to a turning on of power. In addition, the temperature of the heating parts 5 promptly decrease when an object comes into contact therewith. Further, the heating part 5 is laid under the substrate part 5 with low thermal conductivity. Between the adjoining heating wires 50, the substrate part 5 provides a heat insulation part. Accordingly, even if an object contacts, a heat transfer from the other heating wires 50 which are not located directly under the object is suppressed. In addition, the thermal resistance about the current flowing direction of the heating wire 50, i.e., the longitudinal direction, is set greatly enough to enable rapid decrease of a temperature when the object contacts. Thereby, the temperature of the part where the object is contacted is suppressed.

The heating parts 5 are set to reach a radiation temperature for emitting the heat radiation which makes a human to feel warmth. The heating wire 50 have a thermal resistance Rh in the longitudinal direction which is set, when an object contacts on the surface, a temperature of the part where the object contacts falls to a suppressed temperature Tp lower than the radiation temperature Tr. The thermal resistance Rh may be set so that, when an object contacts above the heating wire 50, a temperature of the part where the object contacts is stable at a suppressed temperature Tp which is lower than the radiation temperature Tr and is slightly higher than a temperature of the object before contact. According to this structure, if an object contacts the front surface, a temperature of the contact part will fall to the suppressed temperature Tp from the radiation temperature Tr. The thermal effect on the object which contacted is suppressed.

The electrodes 4, 55 and 56 and the heating wire 50 are connected electrically within the substrate part 2. According to this structure, the electrodes 4, 55 and 56 and the heating wire 50 which are made of different materials are connected within the substrate part 2. For example, the electrodes 4, 55 and 56 and the heating wire 50 are connected by sintering.

(Second Embodiment)

This embodiment is one of modifications based on a basic form provided by the preceding embodiment. In the preceding embodiment, a pair of electrodes 41 and 42 are arranged along with opposing two sides of the substrate part 2, and a plurality of heating belts 5a, 5b, and 5c are arranged among the electrodes 41 and 42. Alternatively, a plurality of electrodes 41, 42, 55, and 56, and a plurality of heating wires 50 may have various forms.

Figure 9:
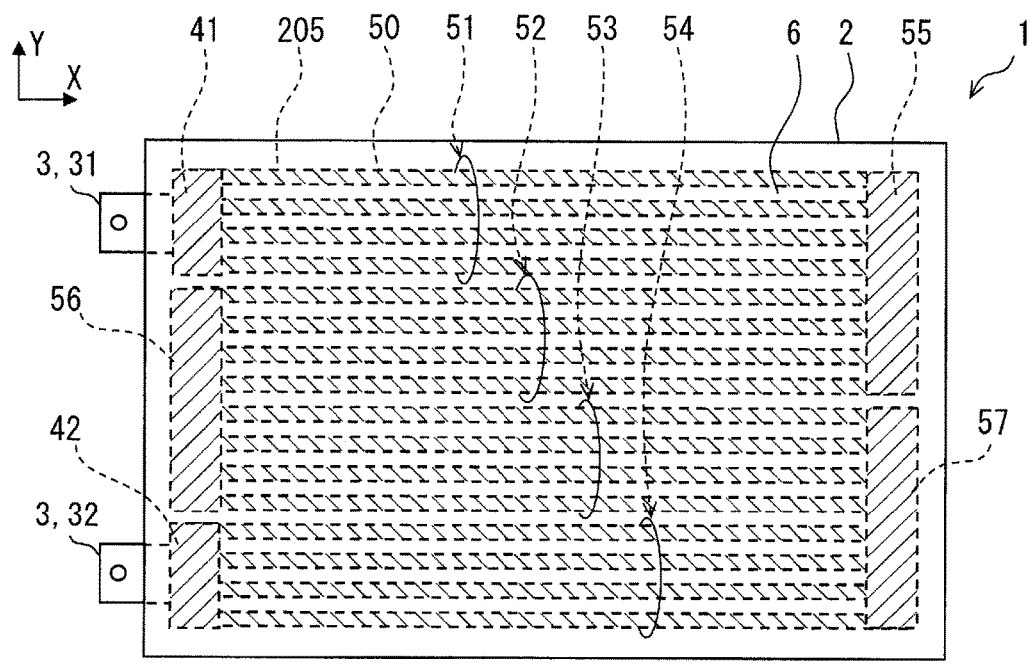
FIG. 9 is a plan view of a radiant heater according to a second embodiment.

In the embodiment illustrated in FIG. 9, a pair of electrodes 41 and 42 are intensively arranged only along with one side of the substrate part 2. The heating part 205 is provided by connecting a plurality of heating wires 50 in series between a pair of electrodes 41 and 42. The heating part 205 has a plurality of parallel groups 51, 52, 53, and 54. Each of these parallel groups 51, 52, 53, and 54 is configured by connecting the plurality of heating wires 50 in parallel. In one parallel group, a plurality of heating wires 50 are connected in parallel by electrodes 55, 56, and 57. The plurality of parallel groups 51, 52, 53, and 54 are connected in series among the electrodes 41 and 42. The plurality of parallel groups 51, 52, 53, and 54 are connected in series by electrodes 55, 56, and 57. In this embodiment, the electrodes 55, 56, and 57 provide a turn electrode too. The electrodes 55, 56, and 57 provide the series-parallel-connection part for the plurality of heating wires.

(Third Embodiment)

This embodiment is one of modifications based on a basic form provided by the preceding embodiment. In the preceding embodiment, a part where the plurality of heating wires 50 are connected in parallel is disposed in one heating belt. Alternatively, one heating belt may consist of only series connection of the plurality of heating wires 50, without disposing the parallel-connection part of the plurality of heating wires 50 in one heating belt.

Figure 10:
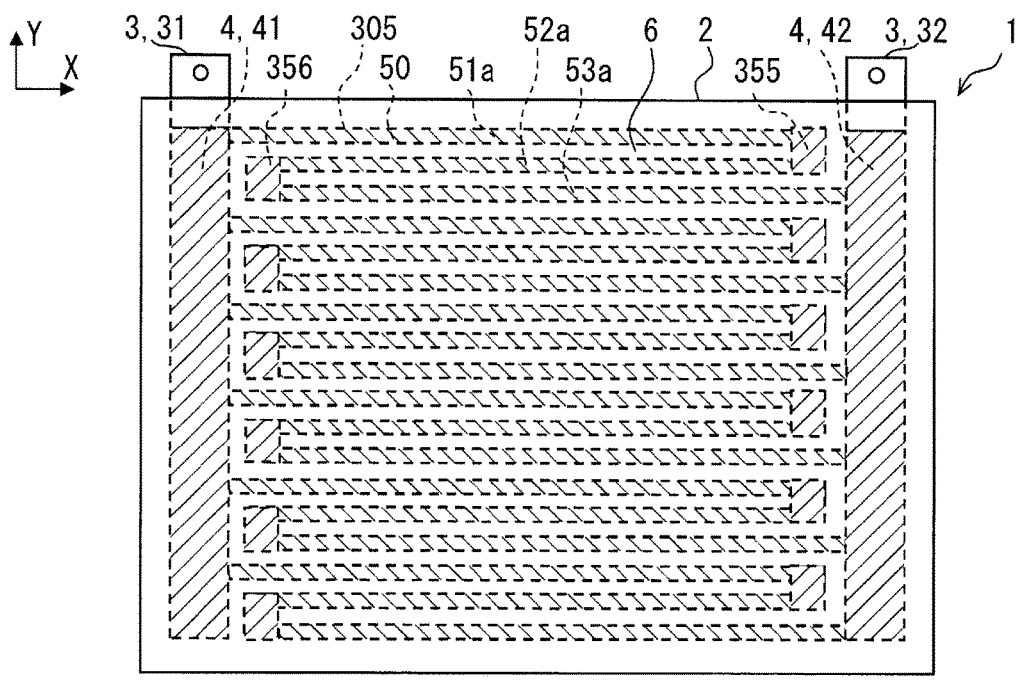
FIG. 10 is a plan view of a radiant heater according to a third embodiment.

In the embodiment illustrated in FIG. 10, the heating part 305 has a plurality of heating belts. In the drawings, six heating belts are illustrated. One heating belt is provided by connecting a plurality of heating wires 50 in series. The plurality of heating wires 51a, 52a, and 53a are connected in series by electrodes 355 and 356. These electrodes 355 and 356 connects the plurality of heating wires 50 only in series, without connecting in parallel. In this embodiment, the electrodes 355 and 356 provide turn electrodes too. The electrodes 55 and 56 provide series connecting parts which connect the plurality of heating wires 50 in series.

(Fourth Embodiment)

Figure 11:
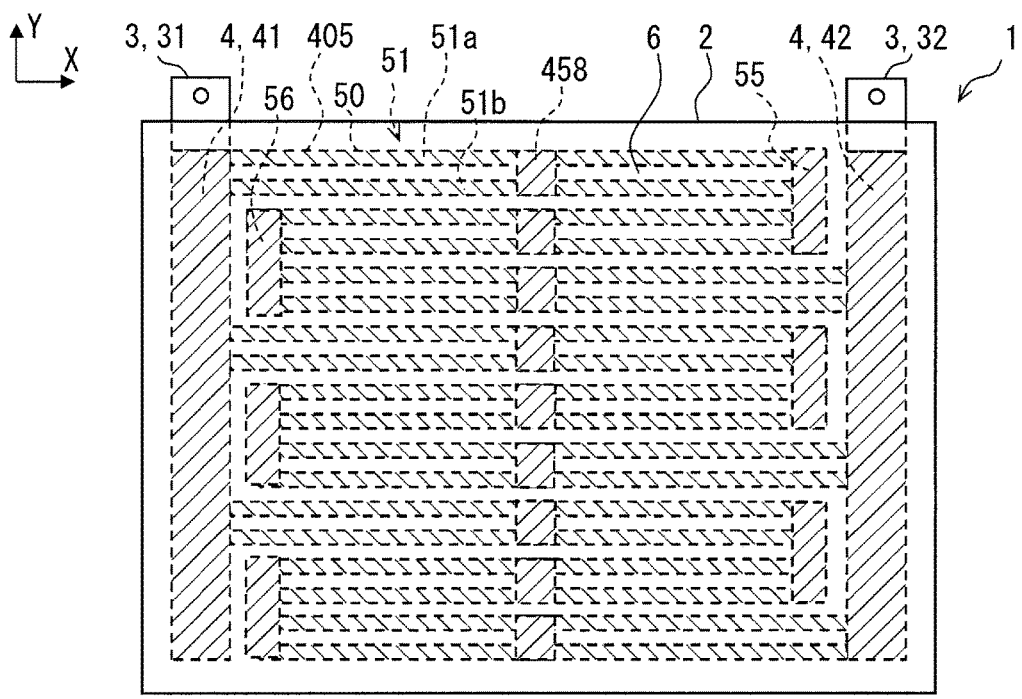
FIG. 11 is a plan view of a radiant heater according to a fourth embodiment.

This embodiment is one of modifications based on a basic form provided by the preceding embodiment. In the preceding embodiment, the electrodes for connecting the plurality of heating wires 50 in parallel and/or in series are arranged only in the turn parts. In addition, in the embodiment illustrated in FIG. 11, a middle electrode 458 electrically connecting and short-circuiting the plurality of heating wires 50 each other is used at a position other than the turn part. The middle electrode 458 short-circuits electrically between a plurality of heating wires 50 which are electrically parallel and adjoin on the substrate part 2. In the parallel groups 51, 52, and 53 formed by connecting at least two heating wires 50 in parallel, the middle electrode 458 electrically short-circuits the plurality of heating wires 50, thereby, provides a series connection between the heating wire parts in front and behind it. The middle electrode 458 provides series-parallel connecting part which connects the plurality of heating wires 50 in parallel and/or in series. For example, the middle electrode 458 short-circuits and connects the plurality of heating wires 51a and 51b belonging to one parallel group 51. The middle electrode 458 are arranged to divide the heating wires 50 into a plurality of parts in the longitudinal direction between the electrodes 41, 42, 55 and 56. The middle electrodes 458 is arranged to divide the heating wire 50 into half along the longitudinal direction.

The middle electrode 458 provides an alternative current route, when an open circuit occurs in one of the plurality of heating wires belonging to one parallel group. Thereby, even if a partial open circuit occurs, it is possible to reduce a decrease of heat-able area.

(Fifth Embodiment)

This embodiment is one of modifications based on a basic form provided by the preceding embodiment. In the preceding embodiment, in order to connect the plurality of heating wires 50 in parallel and/or in series, the electrode having the resistance lower than the heating wire 50 is used. Alternatively, a connecting part may be provided by the same material as the heating wire 50.

Figure 12:
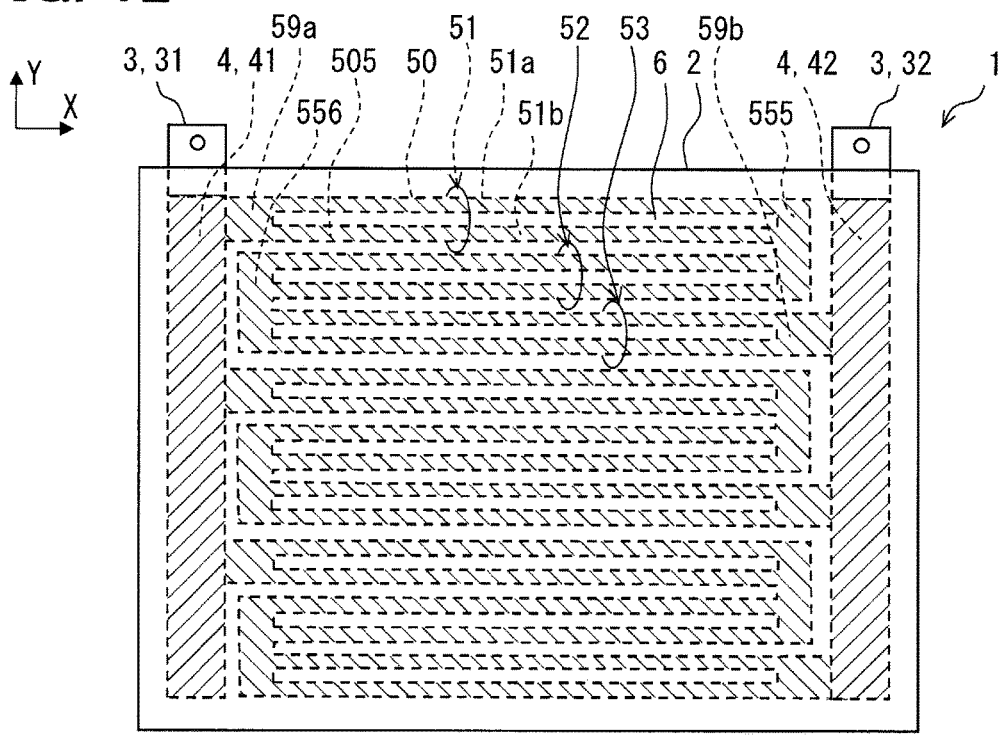
FIG. 12 is a plan view of a radiant heater according to a fifth embodiment.

In FIG. 12, the heating part 505 has a plurality of heating wires 50. The plurality of heating wires 50 provide a plurality of heating belts. One heating belt 5a has the plurality of parallel groups 51, 52, and 53. One parallel group 51 has the plurality of heating wires 51a and 51b which are connected in parallel each other.

A plurality of heating wires 51a and 51b belonging to one parallel group are connected in parallel by two island-like parts in those ends. In this embodiment, four island-like parts 59a, 555, 556, and 59b are disposed. The island-like parts 555 and 556 are disposed as components which substitute the electrodes 55 and 56 of the preceding embodiments. The island-like parts 59a and 59b are disposed between electrodes 41 and 42 and the heating wire 50. These island-like parts 59a, 555, 556, and 59b are formed of the same material as the heating wire 50. The island-like parts 59a, 555, 556, and 59b are formed to provide the cross-sectional area larger than the heating wire 50 along with the current flowing direction. These island-like parts 59a, 555, 556, and 59b provide connecting parts which connect the plurality of heating wires 50 in parallel and/or in series. The island-like parts 59a, 555, 556, and 59b may also be called series-parallel-connection parts which connect the plurality of heating wires 50 in parallel and in series. In this embodiment, the plurality of heating wires 50 are connected in series by the connecting parts 555 and 556 formed of the same material as the heating wires 50.

(Sixth Embodiment)

This embodiment is one of modifications based on a basic form provided by the preceding embodiment. In the above-mentioned embodiment, the heating wire 50 which is extended straightly, long and slender, and linear is used. Alternatively, the heating wire 650 which may be called a surface shape, or a netted form.

Figure 13:
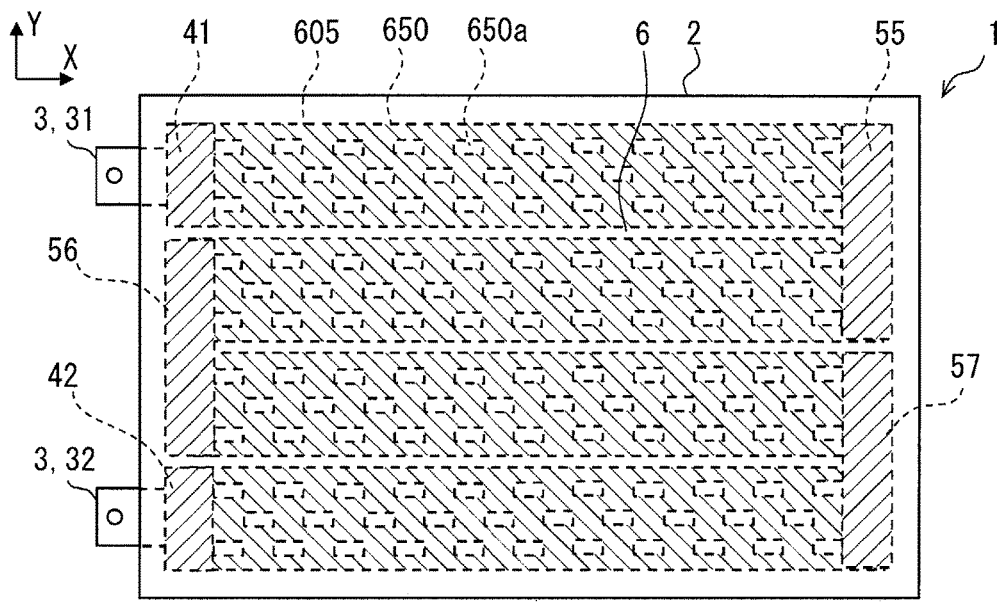
FIG. 13 is a plan view of a radiant heater according to a sixth embodiment.

In FIG. 13, the heating part 605 has a plurality of heating wires 650. One heating wire 650 has width larger than the heating wire 50 of above-mentioned embodiment. The heating wire 650 has a ratio of the length and width which may be called a surface shape compared with the heating wire 50. One heating wire 650 has a plurality of through holes 650a. The plurality of through holes 650a adjust the cross-sectional area in the current flowing direction of the heating wire 650 to the cross-sectional area suitable for generation of heat. The plurality of through holes 650a are arranged regularly on the heating wire 650. The heating wire 650 provides a configuration which may be called a mesh texture. The heating wire 650 in a mesh texture, itself is an aggregate of a plurality of heating wires electrically parallel. The heating wire 650 formed in a mesh texture by the plurality of through holes 650a has many linear parts connected in series. The heating wire 650 in a mesh texture covers a large surface area.

In this embodiment, the plurality of heating wires 650 are connected in series by electrodes 55, 56, and 57. The electrodes 55, 56, and 57 provide the series connection part which connects the plurality of heating wires 650 in series.

The electrodes 55, 56, and 57 are turn parts too. The configuration of the through hole 650*a* may be various configurations. For example, a rectangular shape, an ellipse shape, etc. may be used.

(Seventh Embodiment)

This embodiment is one of modifications based on a basic form provided by the preceding embodiment. In the preceding embodiment, at least a part of the device 1 has a plurality of heating wires electrically parallel. Alternatively, the plurality of heating wires 50 may only be connected in series, without connecting in parallel. In addition, instead of the heating wire 50 extending linearly, a various-shaped heating wire may be used.

Figure 14:
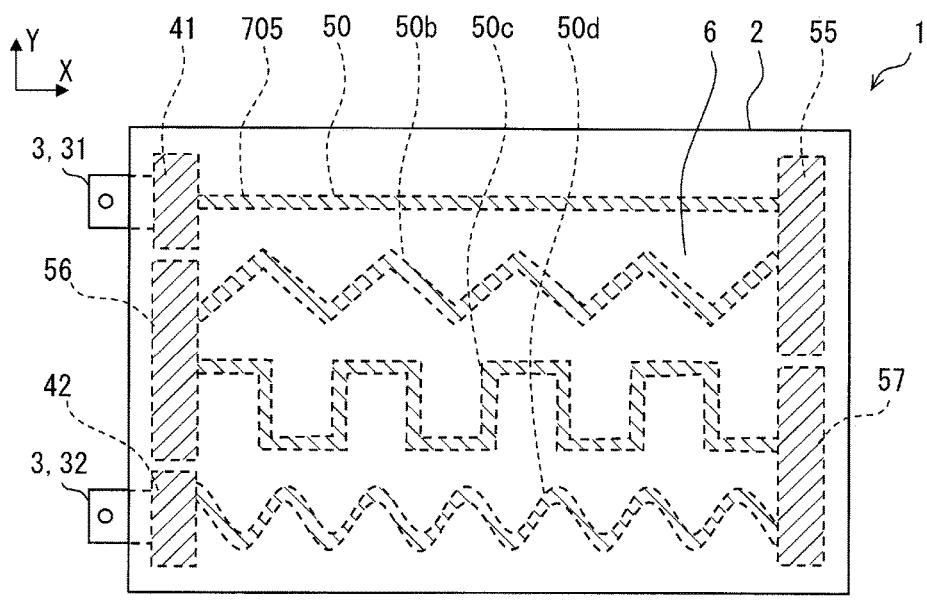
FIG. 14 is a plan view of a radiant heater according to a seventh embodiment.

In FIG. 14, the heating part 705 has a plurality of heating wires 50. The plurality of heating wires 50 are connected in series by electrodes 55, 56, and 57. The electrodes 55, 56, and 57 provide the series connection part which connects the plurality of heating wires 50 in series. The electrodes 55, 56, and 57 are turn parts too.

The heating part 705 has the heating wires 50*b*, 50*c*, and 50*d* extended in a winding manner. The heating wires 50*b*, 50*c*, and 50*d* extend in a winding manner between the electrodes of those ends along the surface of the substrate part 2. The heating wire 50*b* is arranged in a winding manner like a triangular waveform. The heating wire 50*c* is arranged in a winding manner like a square waveform. The heating wire 50*d* is arranged in a winding manner like a smooth waveform. The heating part 705 may consist of only one kind of any one of the heating wires 50*b*, 50*c*, and 50*d*. According to this structure, a large area may be covered by one heating wire.

(Eighth Embodiment)

Figure 15:
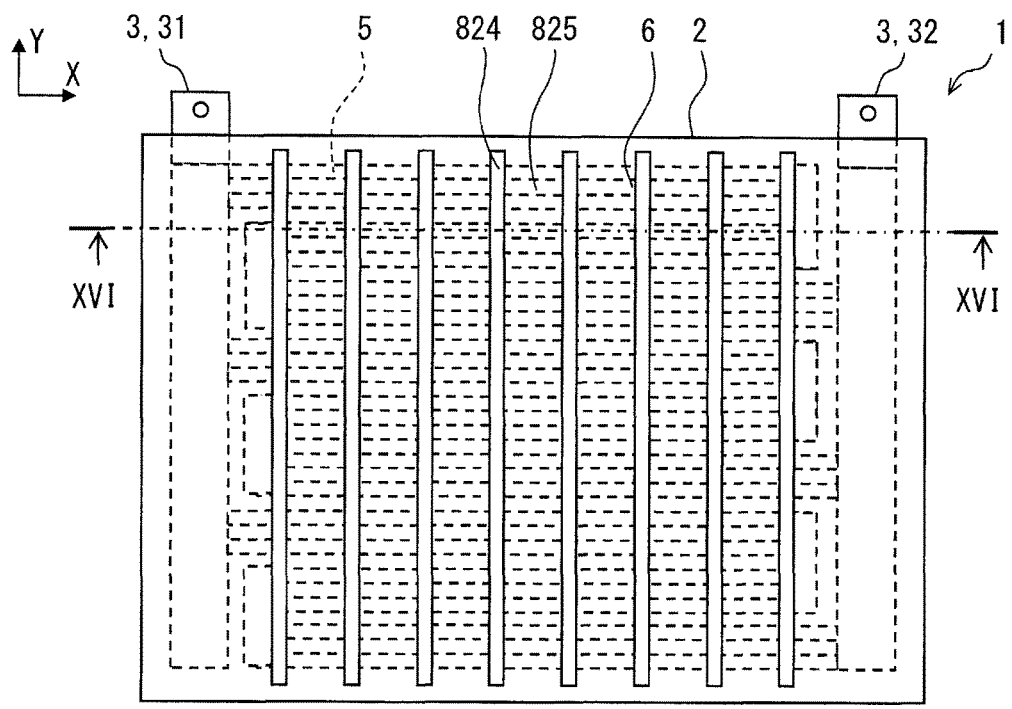
FIG. 15 is a plan view of a radiant heater according to an eighth embodiment.
Figure 16:
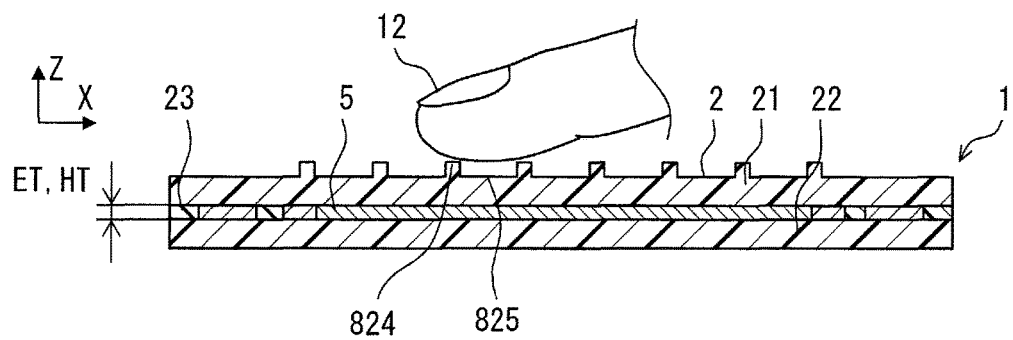
FIG. 16 is a cross sectional view on a line XVI-XVI in FIG. 15.

This embodiment is one of modifications based on a basic form provided by the preceding embodiment. In the preceding embodiment, the front surface of the surface layer 21 is flat. Alternatively, in the embodiment illustrated in FIG. 15 and FIG. 16, a plurality of projections 824 are disposed on the surface of the surface layer 21. The projections 824 are projected ridges formed on the surface layer 21. The projections 824 are narrow projected ridges. Therefore, the projections 824 form parts which are hard to conduct the thermal energy from the heating part 5 on the front surface of the surface layer 21. The projections 824 extend to cross the longitudinal direction of the heating part 5. The projections 824 extend over a plurality of heating parts 5. The projections 824 are arranged to intersect perpendicularly with all the heating parts 5 arranged in parallel.

The plurality of projections 824 define a plurality of depressions 825 among them. The plurality of projections 824 are arranged in parallel each other. Spaces of the plurality of projections 824 are set less than 5 millimeters.

In this structure, the substrate part 2 has projection 824 which project towards a radiating direction of the heat radiation R, and depressions 825 which adjoins the projection 824. The projections 824 are arranged dispersively over a range where the plurality of heating parts 5 are arranged. As a result, the depressions 825 which adjoins the projections 824 are also dispersively arranged on the front surface.

When an object contacts the front surface of the surface layer 21, the object may contact on a top plane of the projection 824. The projection 824 and the depression 825 suppress a contact surface area where the object directly contacts on the surface layer 21. The projection 824 provides long heat transfer distance. The depression 825 provides an air layer with high insulation properties. The projection 824 and the depression 825 suppress that the object, such as humans, approach to a high temperature section including just above the heating wire 50. As a result, a direct heat transfer from the radiant heater 1 to the object is reduced.

(Ninth Embodiment)

Figure 17:
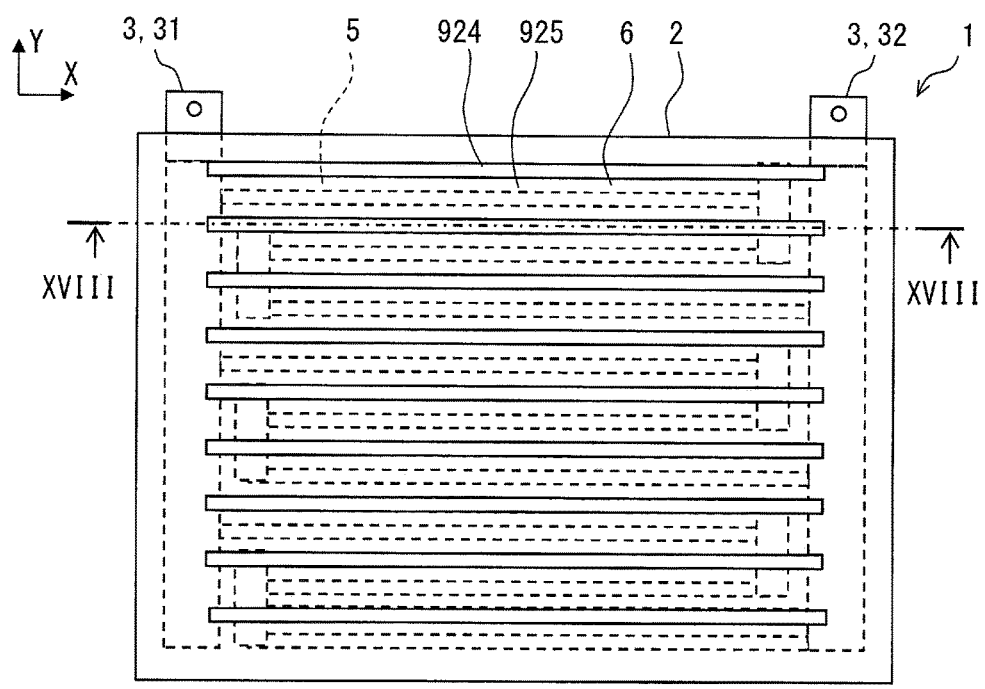
FIG. 17 is a plan view of a radiant heater according to a ninth embodiment.
Figure 18:
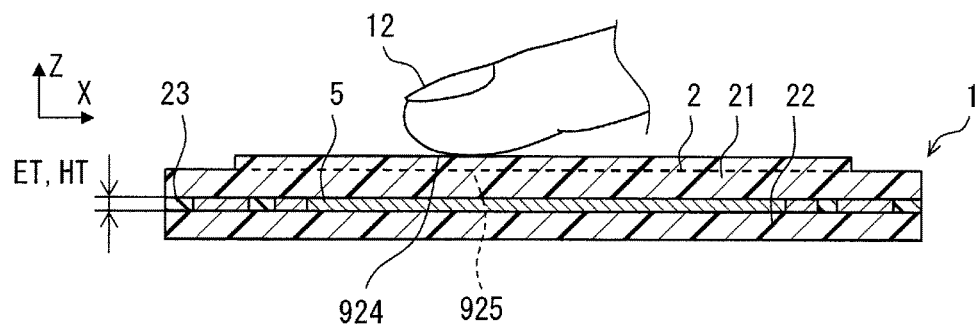
FIG. 18 is a cross sectional view on a line XVIII-XVIII in FIG. 17.

This embodiment is one of modifications based on a basic form provided by the preceding embodiment. In the preceding embodiment, the projections 824 are used. Alternatively, in the embodiment illustrated in FIG. 17 and FIG. 18, projections 924 are used. The surface layer 21 has a plurality of projections 924. The projections 924 extend in parallel with the heating part 5. The projection 924 is positioned just above the heating part 5. In other words, the projection 924 is disposed to overlap on the heating part 5. The plurality of projections 924 define depressions 925 among them. In this configuration, an object may contact a top surface of the projection 924 too. As a result, the heat transfer from the radiant heater 1 to the object is reduced.

(Tenth Embodiment)

Figure 19:
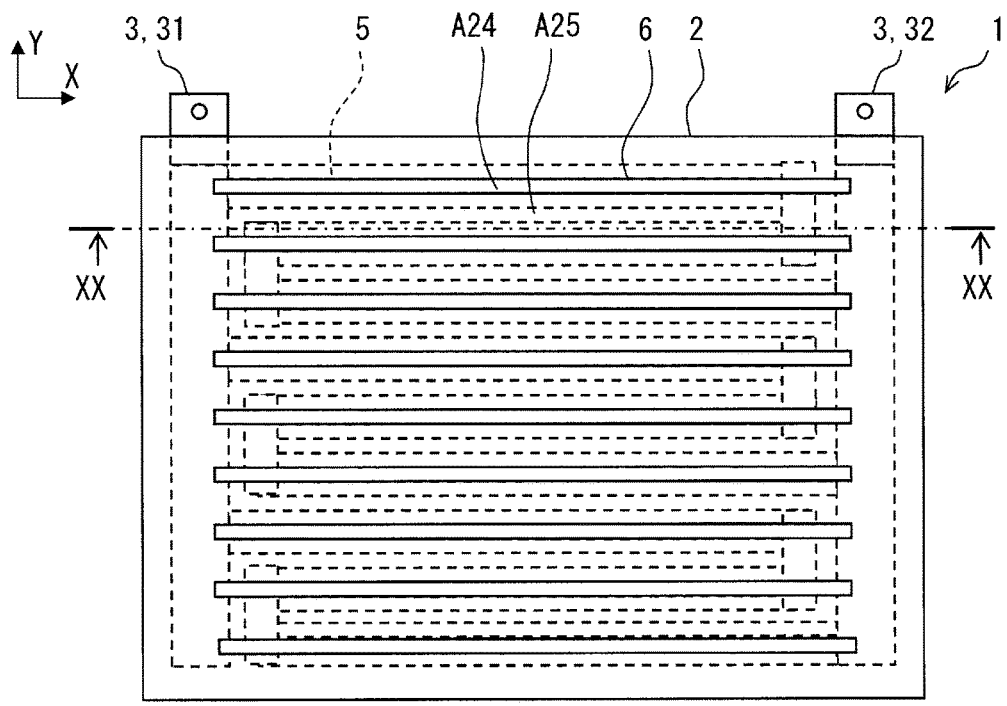
FIG. 19 is a plan view of a radiant heater according to a tenth embodiment.
Figure 20:
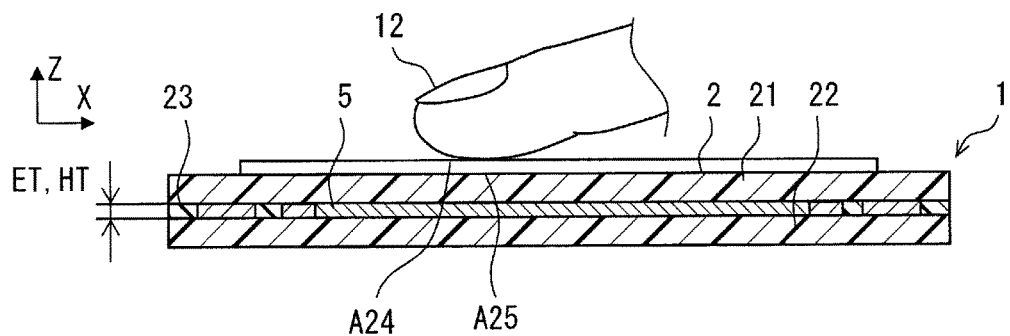
FIG. 20 is a cross sectional view on a line XX-XX in FIG. 19.

This embodiment is one of modifications based on a basic form provided by the preceding embodiment. In the preceding embodiment, the projections 924 are used. Alternatively, in the embodiment illustrated in FIG. 19 and FIG. 20, projections A24 are used. The surface layer 21 has a plurality of projections A24. The projections A24 extend in parallel with the heating part 5. The projections A24 are positioned just above the clearance 6. In other words, the projection A24 is disposed to not overlap on the heating part 5. The plurality of projections A24 define depressions A25 among them. In this configuration, an object may contact a top surface of the projection A24 too. As a result, the heat transfer from the radiant heater 1 to the object is reduced.

(Eleventh Embodiment)

Figure 21:
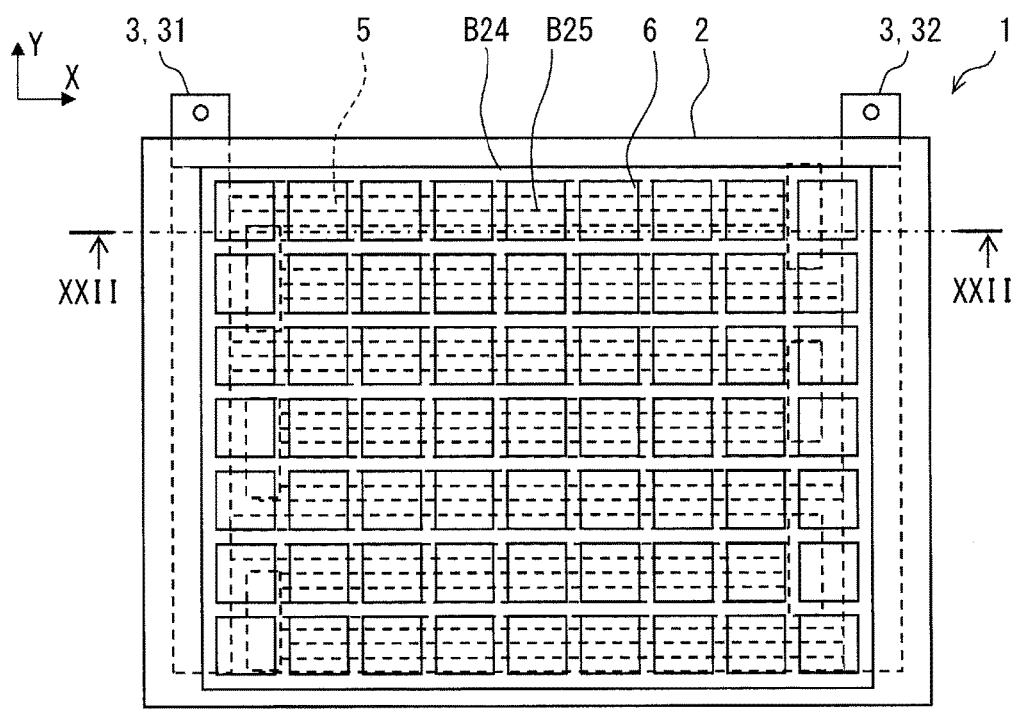
FIG. 21 is a plan view of a radiant heater according to an eleventh embodiment.
Figure 22:
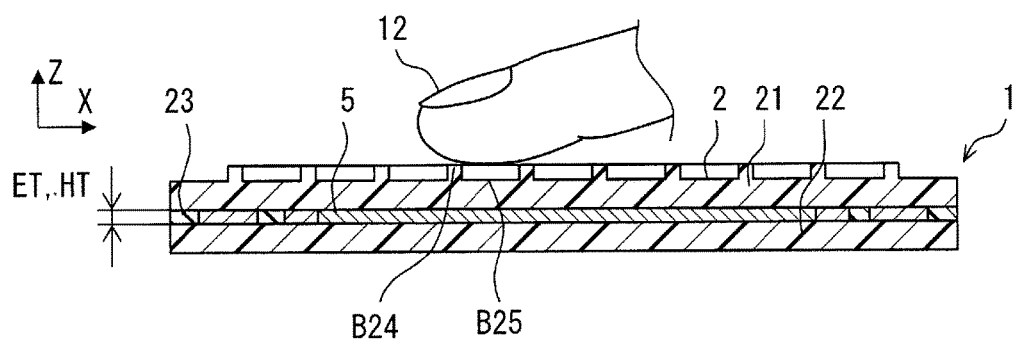
FIG. 22 is a cross sectional view on a line XXII-XXII in FIG. 21.

This embodiment is one of modifications based on a basic form provided by the preceding embodiment. In the preceding embodiments, projections extending in parallel are used. Alternatively, in the embodiment illustrated in FIG. 21 and FIG. 21, a grid-like projection B24 is used. The surface layer 21 has a grid-like projection B24 containing a plurality of projected ridges which cross each other. The projection B24 contains projected ridges extending in parallel with the heating part 5, and projected ridges crossing with the heating part 5. In the illustrated example, a plurality of projected ridges cross at right angles. Some projected ridges are positioned just above the heating parts 5. Some projected ridges are positioned just above the clearance 6. The projection B24 defines depressions B25 among them. The depressions B25, each other, are independently placed on the mesh. In this configuration, an object may contact a top surface of the projection B24 too. As a result, the heat transfer from the radiant heater 1 to the object is reduced.

(Twelfth Embodiment)

Figure 23:
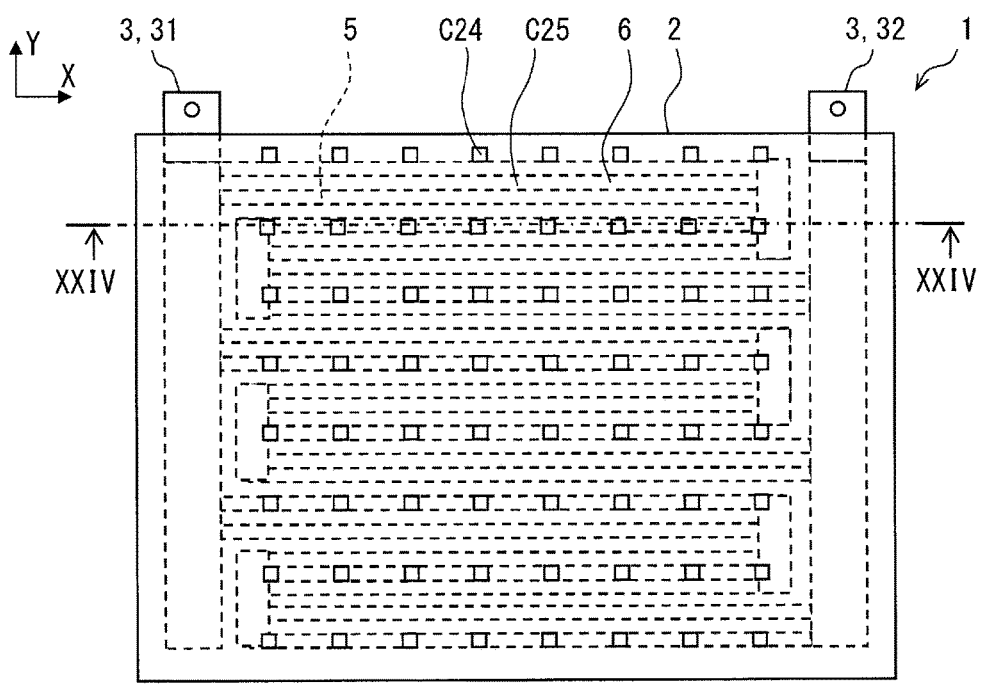
FIG. 23 is a plan view of a radiant heater according to a twelfth embodiment.
Figure 24:
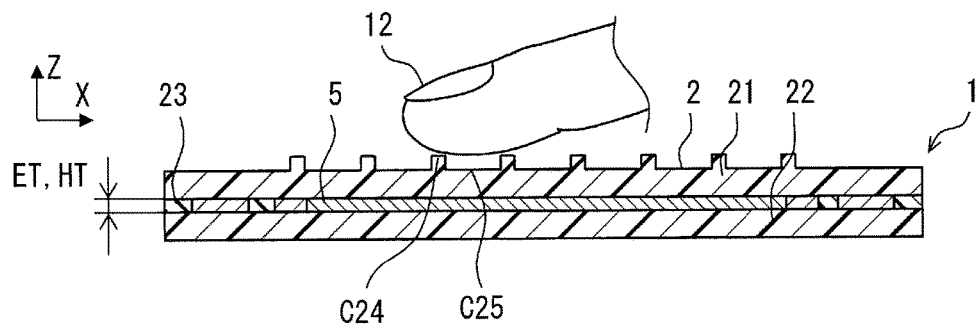
FIG. 24 is a cross sectional view on a line XXIV-XXIV in FIG. 23.

This embodiment is one of modifications based on a basic form provided by the preceding embodiment. In the preceding embodiments, projections extending long and narrow are used. Alternatively, in the embodiment illustrated in FIG. 23 and FIG. 24, a dot-like projection C24 is used. The surface layer 21 has a plurality of projections C24. The projection C24 has a dot-like configuration on the X-Y plan. Some projections C24 are positioned just above the heating parts 5. Some projections C24 are positioned just above the clearance 6. The projections C24 define a depression C25 among them. In this configuration, an object may contact a top surface of the projection C24 too. As a result, the heat transfer from the radiant heater 1 to the object is reduced.

(Other Embodiments)

The disclosed technique are not limited to the above embodiments, and may be practiced in various modified embodiments. The present disclosure is not limited to the above combination, and disclosed technical means can be practiced independently or in various combinations. Each embodiment can have an additional part. The part of each embodiment may be omitted. Part of embodiment may be replaced or combined with the part of the other embodiment. The configurations, functions, and advantages of the above-mentioned embodiments are just examples. Technical scope of disclosure is not limited to the embodiments. Some extent of the disclosure may be shown by the scope of claim, and also includes the changes, which is equal to and within the same range of the scope of claim.

In the preceding embodiment, the electrodes 4 and the heating parts 5 are connected by sintering. Alternatively, a connection between the electrodes 4, and the heating parts 5 may be provided by a joined portion using a metal joining material such as soldering, brazing, or welding, or a joined portion using a mechanical joining member such as crimping, or a screw tightening.

In the preceding embodiments, a unit for the radiant heater 1 is illustrated and explained. A single unit of the radiant heater 1 may be installed in the room. Alternatively, a plurality of units of the radiant heater 1 may be arranged to form an array of the radiant heater device.

In the preceding embodiments, projections 824, 924, A24, B24, and C24 and depressions 825, 925, A25, B25, and C25 are formed on the surface layer 21. Alternatively, an additional layer that provides projections and depressions may be added on the surface layer 21. In this case, the surface layer is provided by a plurality of layers.

In the preceding embodiment, in each of the heating belts 5a, 5b, and 5c, the plurality of parallel groups 51, 52, and 53 are connected in series. Alternatively, only in one heating belt, the plurality of parallel groups 51, 52, and 53 may be connected in series. In this case, remaining heating belt may be provided by a plurality of heating wires 50 without series connection. Such structure that has the series connection of the heating wires 50 in at least partially may be adopted.

In the preceding embodiment, the heating wire 50 is extended in linear shape. Alternatively, a winding shaped heating wire may be used. For example, a heating wire which winds in a shape of a rectangle waveform, or a heating wire which winds in a smooth waveform may be used.

The invention claimed is:

1. A radiant heater comprising:
   a substrate part formed by electrical insulation material to provide a surface; and
   a heating part which is supported by the substrate part to extend along the surface, and emits radiant heat by generating heat in response to a power supply, wherein
   the heating part is set to reach a radiation temperature for emitting the radiant heat which makes a human feel warmth, and wherein
   a pair of electrodes supported by the substrate part to be extended along the surface, wherein
   the heating part includes a plurality of heating wires which are made by material with high specific resistance higher than the pair of electrodes, and are connected in series at least partially between the pair of electrodes, and wherein
   the plurality of heating wires are electrically connected in parallel at least partially between the pair of electrodes, and wherein
   the heating part has a thermal resistance which is set so that, when an object contacts the surface, a temperature of the heating part where the object contacts falls to a reduced temperature lower than the radiation temperature, and
   further comprising a connecting part formed of the same material as the electrodes, the connecting part connects the plurality of heating wires in series, wherein the connecting part is arranged at a turn part where current changes flowing direction, and wherein the connecting part has an electric specific resistance of the material which is lower than the electric specific resistance of the material of the heating wires.

2. The radiant heater claimed in claim 1, wherein the plurality of heating wires are arranged parallel to each other.

3. The radiant heater claimed in claim 1, wherein the plurality of heating wires are connected in series by connecting parts formed of the same material as the plurality of heating wires.

4. The radiant heater claimed in claim 1, wherein the connecting part connects at least two of the plurality of heating wires in parallel to form a plurality of parallel groups and connects the plurality of parallel groups in series.

5. The radiant heater claimed in claim 1, wherein the pair of electrodes and the plurality of heating wires are connected electrically within the substrate part.

6. The radiant heater claimed in claim 5, wherein the pair of electrodes and the plurality of heating wires are connected by sintering.

7. The radiant heater claimed in claim1, wherein the plurality of heating wires extend in linear shape.

8. The radiant heater claimed in claim 1, wherein the plurality of heating wires extend in a winding manner.

9. The radiant heater claimed in claim 1, further comprising:
   a middle electrode which provides a series connection by electrically short-circuiting the plurality of heating wires in a parallel group formed by connecting at least two heating wires in parallel.

10. The radiant heater claimed in claim 1, wherein the substrate part is a plate-like shape and the heating part is a film-like shape spreading along the surface.

11. The radiant heater claimed in claim 1, wherein the substrate part has a surface layer and a back layer, and wherein the heating part is arranged between the surface layer and the back layer.

12. The radiant heater claimed in claim 1, wherein the heating part has a heating wire which is formed in a mesh texture by a plurality of through holes.

13. The radiant heater claimed in claim 1, wherein the substrate part has a projection which projects towards a radiating direction of the radiant heat, and a depression which adjoins the projection.

* * * * *